Jan. 22, 1963 C. D. IHRIG 3,075,075

CODED RAILWAY SIGNALING SYSTEMS EMPLOYING NORMALLY ENERGIZED REVERSIBLE TRACK CIRCUITS

Original Filed Sept. 7, 1954 18 Sheets-Sheet 2

INVENTOR.
Clifford D. Ihrig
BY
W. L. Stout
HIS ATTORNEY

Jan. 22, 1963 C. D. IHRIG 3,075,075

CODED RAILWAY SIGNALING SYSTEMS EMPLOYING NORMALLY ENERGIZED REVERSIBLE TRACK CIRCUITS

Original Filed Sept. 7, 1954

18 Sheets-Sheet 4

Jan. 22, 1963 C. D. IHRIG 3,075,075

CODED RAILWAY SIGNALING SYSTEMS EMPLOYING NORMALLY ENERGIZED REVERSIBLE TRACK CIRCUITS

Original Filed Sept. 7, 1954 18 Sheets-Sheet 5

Jan. 22, 1963 C. D. IHRIG 3,075,075

CODED RAILWAY SIGNALING SYSTEMS EMPLOYING NORMALLY ENERGIZED REVERSIBLE TRACK CIRCUITS

Original Filed Sept. 7, 1954 18 Sheets-Sheet 6

INVENTOR.
Clifford D. Ihrig
BY W. L. Stout
HIS ATTORNEY

Jan. 22, 1963 C. D. IHRIG 3,075,075

CODED RAILWAY SIGNALING SYSTEMS EMPLOYING NORMALLY ENERGIZED REVERSIBLE TRACK CIRCUITS

Original Filed Sept. 7, 1954 18 Sheets-Sheet 7

INVENTOR.

Clifford D. Ihrig

BY

W. L. Stout

HIS ATTORNEY

Jan. 22, 1963 C. D. IHRIG 3,075,075
CODED RAILWAY SIGNALING SYSTEMS EMPLOYING NORMALLY
ENERGIZED REVERSIBLE TRACK CIRCUITS
Original Filed Sept. 7, 1954 18 Sheets-Sheet 8

INVENTOR.
Clifford D. Ihrig
BY
W. L. Stout
HIS ATTORNEY

INVENTOR.
Clifford D. Ihrig
BY W. L. Stout
HIS ATTORNEY

Jan. 22, 1963 C. D. IHRIG 3,075,075

CODED RAILWAY SIGNALING SYSTEMS EMPLOYING NORMALLY ENERGIZED REVERSIBLE TRACK CIRCUITS

Original Filed Sept. 7, 1954 18 Sheets-Sheet 11

INVENTOR.
Clifford D. Ihrig
BY
W. L. Stout.
HIS ATTORNEY

Jan. 22, 1963 C. D. IHRIG 3,075,075

CODED RAILWAY SIGNALING SYSTEMS EMPLOYING NORMALLY ENERGIZED REVERSIBLE TRACK CIRCUITS

Original Filed Sept. 7, 1954 18 Sheets-Sheet 12

INVENTOR.
Clifford D. Ihrig.
BY
W. L. Stout.
HIS ATTORNEY

INVENTOR.
Clifford D. Ihrig
BY
W. L. Stout
HIS ATTORNEY

United States Patent Office 3,075,075
Patented Jan. 22, 1963

3,075,075

CODED RAILWAY SIGNALING SYSTEMS EMPLOYING NORMALLY ENERGIZED REVERSIBLE TRACK CIRCUITS

Clifford D. Ihrig, Penn Hills Township, Allegheny County, Pa., assignor to Westinghouse Air Brake Company, Wilmerding, Pa., a corporation of Pennsylvania Original application Sept. 7, 1954, Ser. No. 454,251, now Patent No. 2,954,463, dated Sept. 27, 1960. Divided and this application Sept. 8, 1959, Ser. No. 838,601
4 Claims. (Cl. 246—3)

Figure 1A:
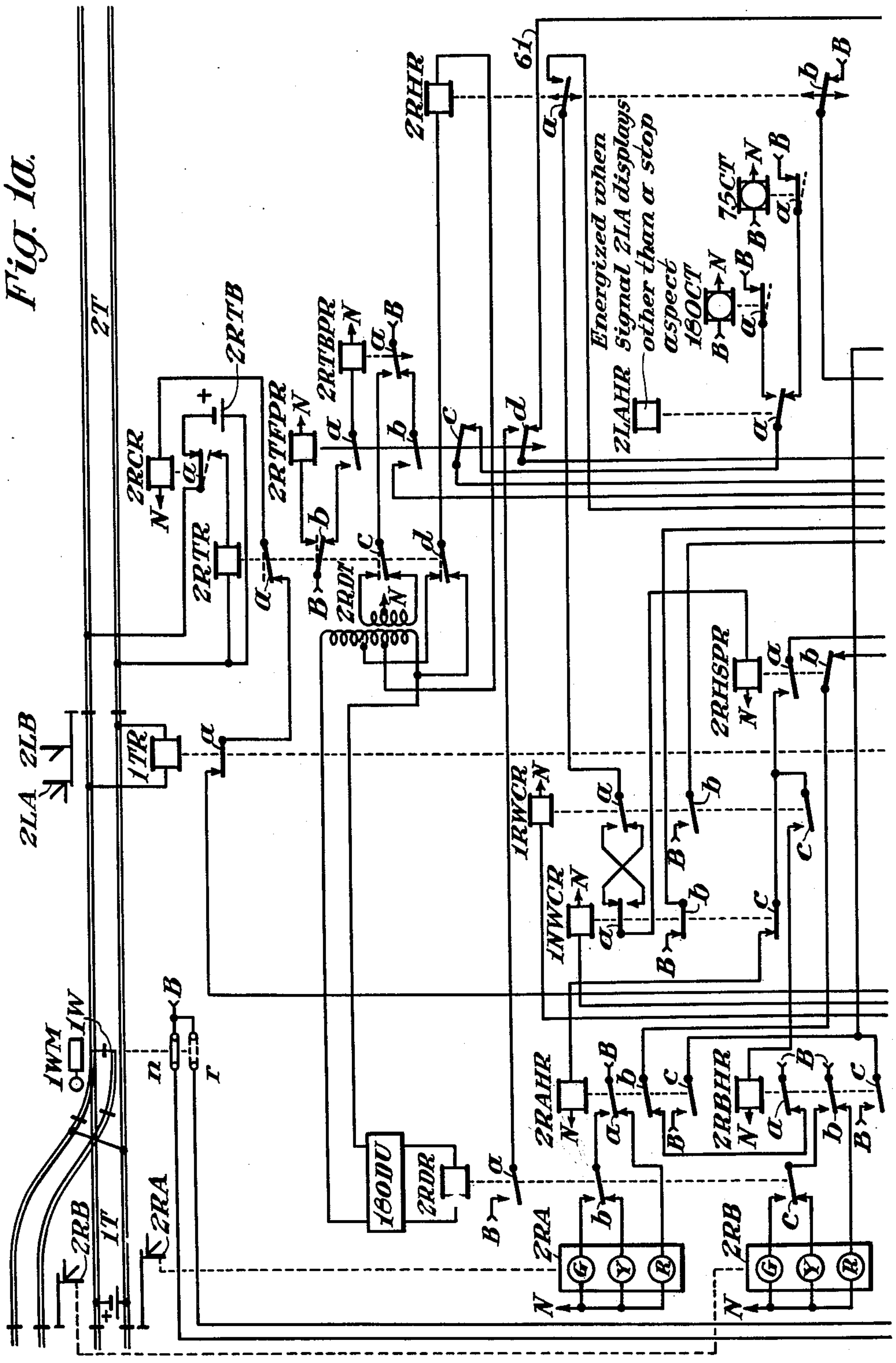
Figure 1B:
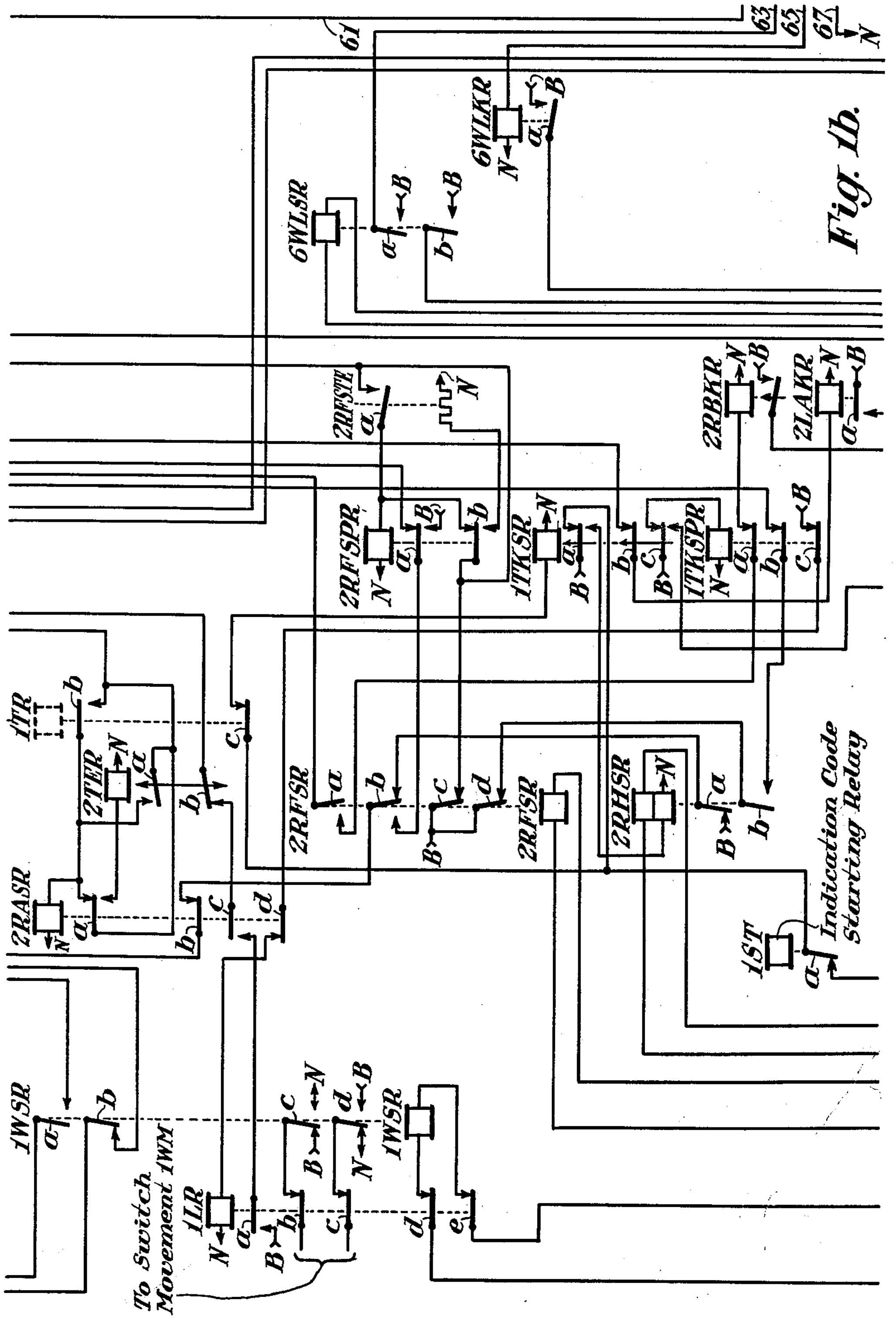
Figure 1C:
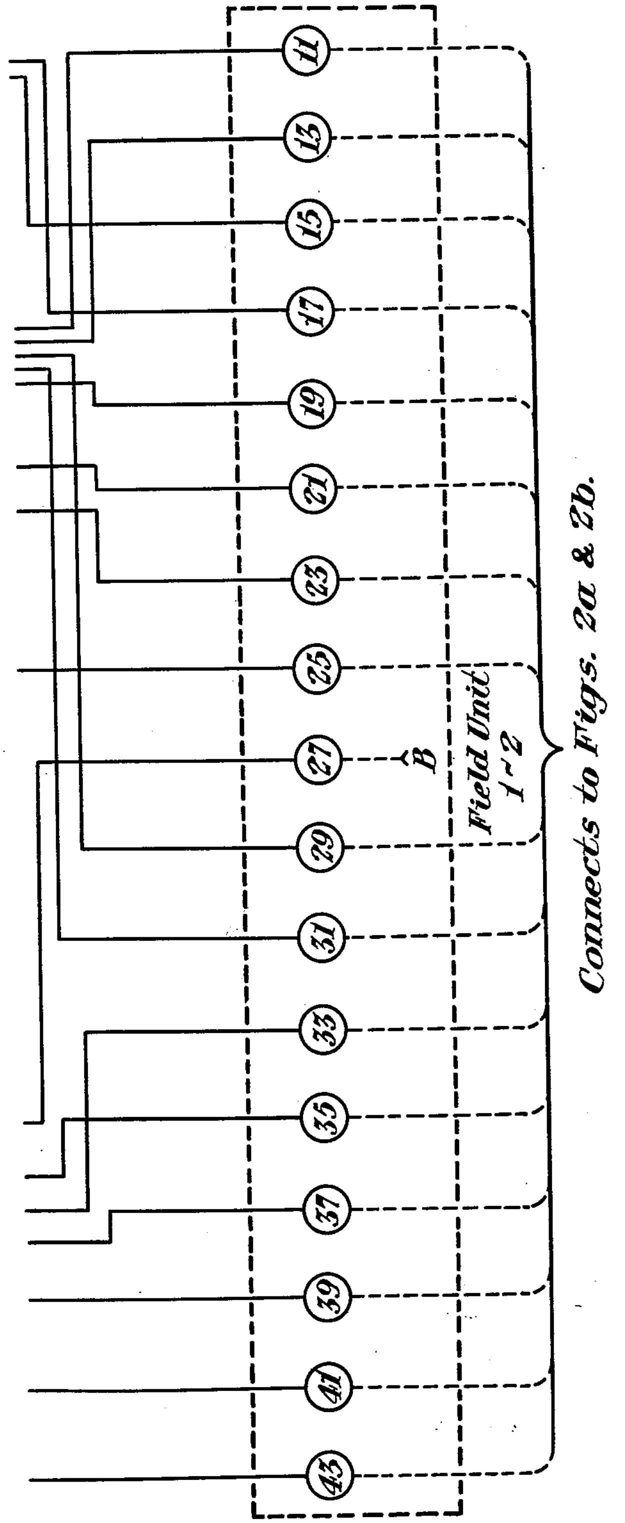

My invention relates to coded railway signaling systems, and particularly to a coded railway signaling system employing normally energized, reversible track circuits and of the type in which the movements of traffic through a stretch of railway track are directed from a centralized point, to provide what is commonly known as a contralized traffic control railway signaling system. My invention further relates to systems of the type described, in which a stretch of railway track is arranged in such manner that the track sections therein are normally energized with steady energy, this energy being changed to coded energy of a suitable type and direction when a train movement is to be made through the stretch.

The present application is a division of my copending application for Letters Patent of the United States Serial No. 454,251, filed September 7, 1954, for Coded Railway Signal Systems Employing Normally Energized, Reversible Track Circuits, now Patent No. 2,954,463, issued September 27, 1960.

In systems of this general type, as previously proposed, it has been customary practice to provide a single block indication light on the control machine to indicate when a stretch of single track is occupied. Although this single block indication light will provide information to the control operator as to whether or not a particular single track stretch is occupied by a train, it does not provide information as to the relative progress of the train, such as would be accomplished by providing at least two block indication lights. It would be of considerable assistance to the operator to have two block occupancy lights in each single track stretch, each light indicating when at least one half of the single track stretch is occupied. Further assistance to the operator may be obtained if the portions of the stretch covered by each light overlap, so that at times both lights simultaneously indicate track occupancy.

In systems of this general type, provision is made for the control of hand-operated switches located at some point in the single track stretch between passing sidings, such hand-throw switches being governed by electric switch locks, which require the cooperation of the train crew and the control operator before the hand-throw switch can be unlocked to permit a train to enter or leave a spur track at that point. In circuits heretofore used, in which the unlocking control for a move through a hand-throw switch equipped with an electric switch lock is obtained by measuring a time interval following the entrance of a train into a track section in which the electrically locked switch is located, it has been necessary to provide conventional track circuits to obtain the timing operation. Such conventional track circuits must be by-passed with line wires to carry coded track energy around the conventional track circuit to provide coded operation for the remainder of the track sections in the stretch.

Moreover, in systems of this general type as previously proposed, the control of such switch locks has been accomplished by a number of line wire circuits extending from a control location to the switch lock location, since it is necessary to provide suitable indications to the control operator of the conditions at the hand-throw switch location. It is of course desirable to keep the number of line wires necessary for these control circuits to a minimum. It is even more desirable to eliminate the line wires which pass the coded track circuits around the conventional track circuits at the switch location, since these wires are more vulnerable to the elements and are thus more likely to cause track circuit failures which result in unnecessary delays to through trains. It would be highly advantageous to carry as many as possible of the controls and indications for the switch lock in the track circuits used for the basic signal system, eliminating entirely the short conventional track circuits and the by-pass line wires and requiring only short wire leads from the nearest intermediate signal for the majority of the controls and indications.

Accordingly, an object of my invention is to provide a railway signaling system of the centralized traffic control type in which the control of an electric switch lock located in a single track stretch is obtained by utilizing steady energy to check that the stretch is unoccupied by an opposing train and that no conflicting controlled signal is clear before a switch can be unlocked for a move therethrough from a spur track. Thus, an unauthorized manipulation of the electric lock mechanism cannot disturb the signals for an established train movement.

An additional object of my invention is to provide, in a system of the type described, means for supplying an indication to the control operator to operate the system to change the steady energy normally supplied to the single track stretch to coded energy to provide suitable approach locking for protection of the hand-throw switch.

A further object of my invention is the provision of a switch locking control circuit, for entering moves into a siding, including a suitable time element means controlled by coded track energy for timing the occupancy of the track section in which the switch lock is located.

It is also an object of my invention to provide an improved arrangement for governing the control and indication of the electric switch locks in a single track stretch used in a system of the type described, in which a minimum number of line wires is employed between the main control point and the switch lock location, the circuits using a series type control to provide the necessary controls and indications so that two less wires are required over previous arrangements.

Still another object of my invention is the provision of a novel arrangement of circuits in the control machine for sending a suitable control code to a field location when an indication is received at the control machine from the field location that the presence of steady energy at a switch lock location has been properly detected.

Other objects, purposes, and characteristic features of my invention will be apparent from the following description taken in connection with the accompanying drawings.

In practicing the invention, I first provide suitable circuits associated with the single track stretch for checking the occupied or unoccupied condition of the track sections, which circuits are arranged to send suitable indications to the control office for the control of two approach indication lamps on the control machine. The indication lamps are controlled in such manner that the lamps are normally dark. They are lighted over contacts of indication relays which are controlled by the circuits in the field, and also over contacts of block indication relays, so that the lamps are lighted only when a train is occupying the single track stretch and coded energy is being supplied thereto for the control of the signals. I further provide a suitable circuit at a switch lock control location for checking the presence of steady energy in a single track stretch when a movement is to be made from a spur track through the hand-throw switch controlled by an electric lock. These circuits are arranged so that a suitable code is transmitted to the control machine, which then acts to govern the field controls in such manner that the supply of steady energy is cut off and coded energy is transmitted from each end of the single track stretch to permit the unlocking of the hand-throw switch. I also provide a suitable time element relay and associated circuits, controlled by the regular coded track circuits, for timing the occupancy of a track section in which the switch lock lies in order to permit a train on the main track to unlock the hand-throw switch for a move into the spur track.

I shall describe one form of coded railway signaling system embodying my invention, and shall then point out the novel features thereof in the claims.

Figure 3:
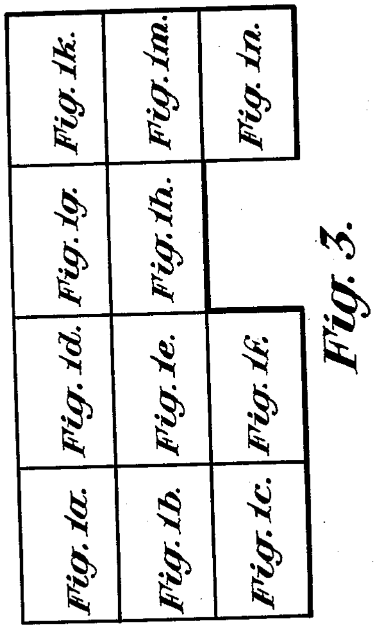
Figure 2A:
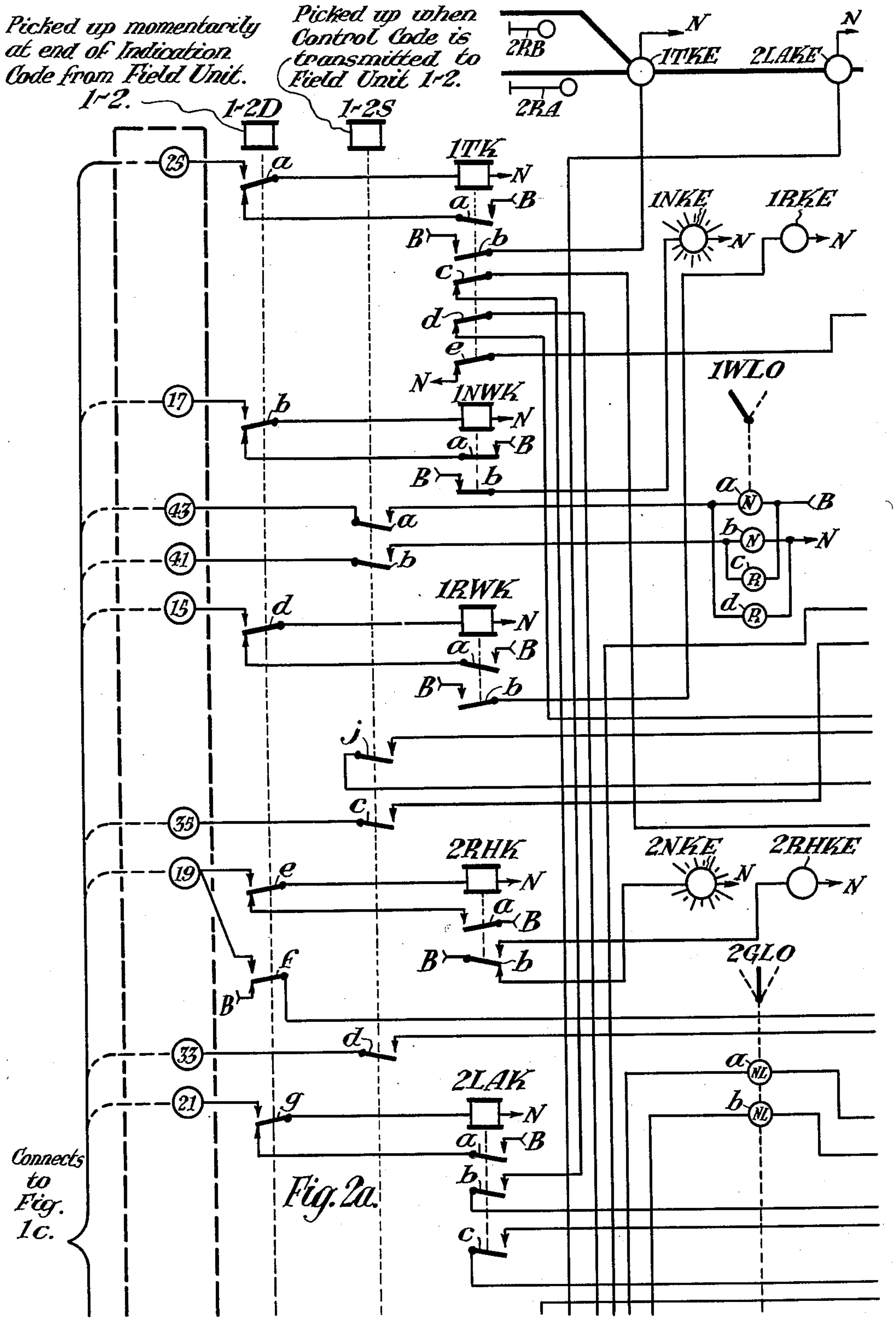
Figure 2B:
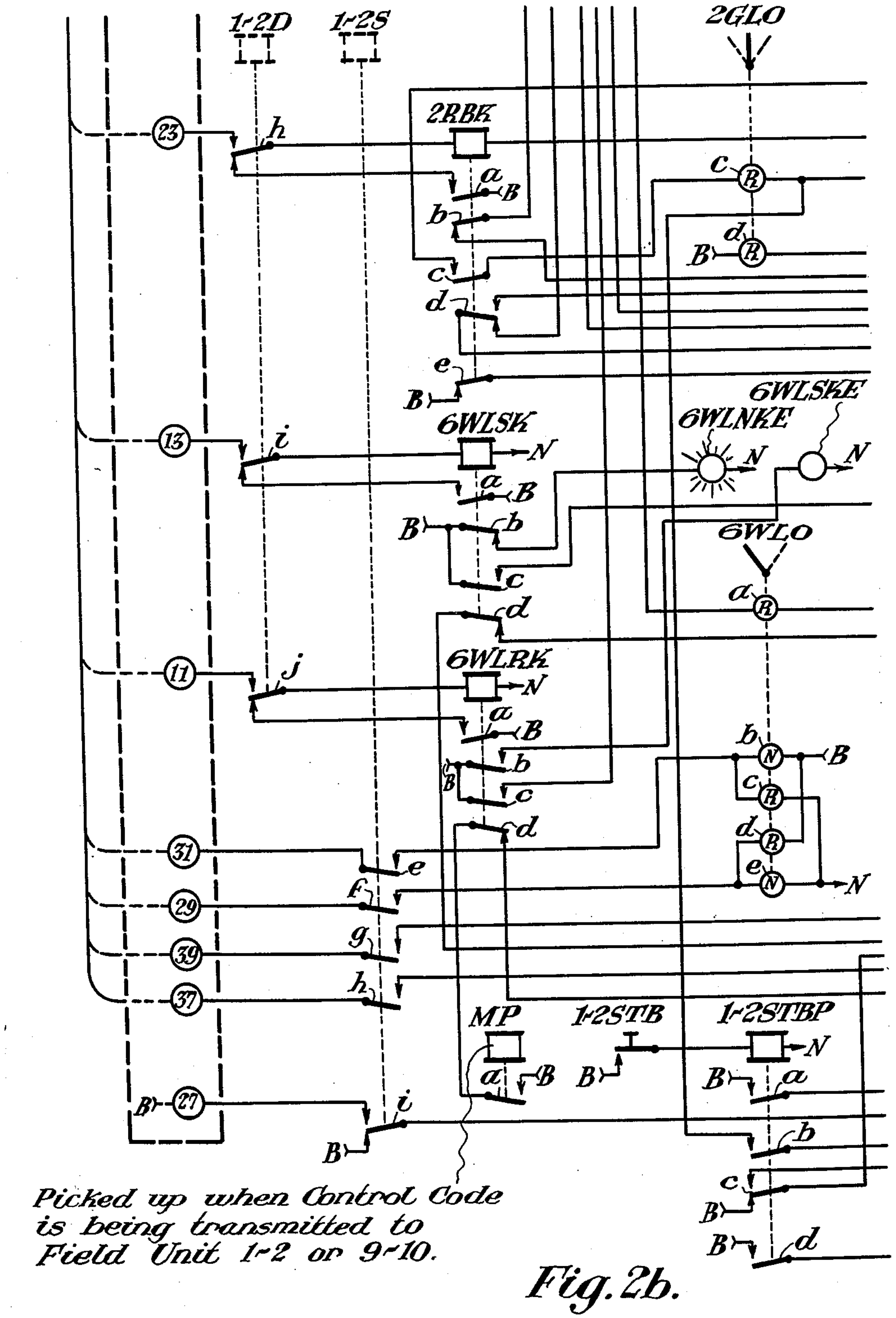
Figure 2C:
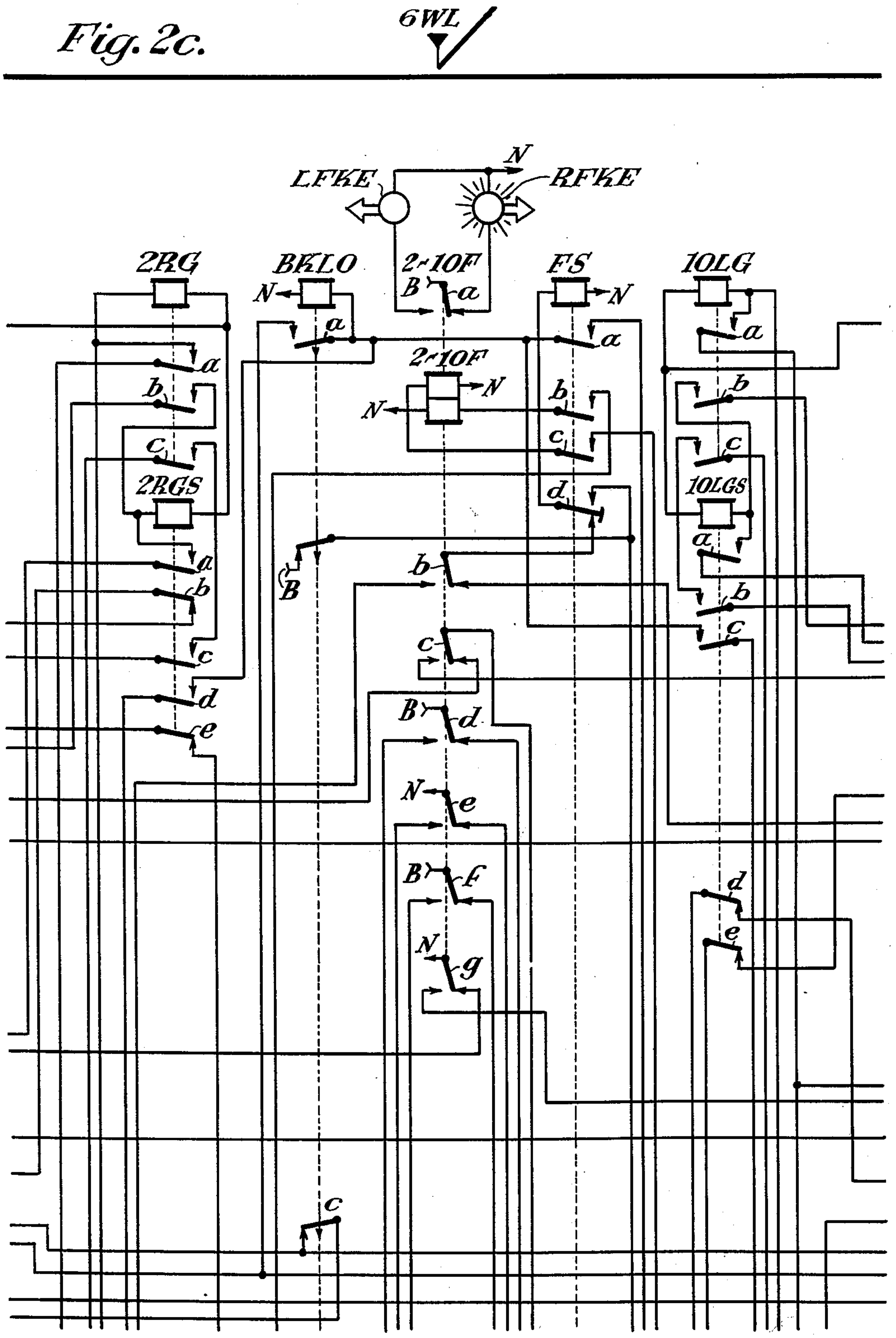
Figure 2D:
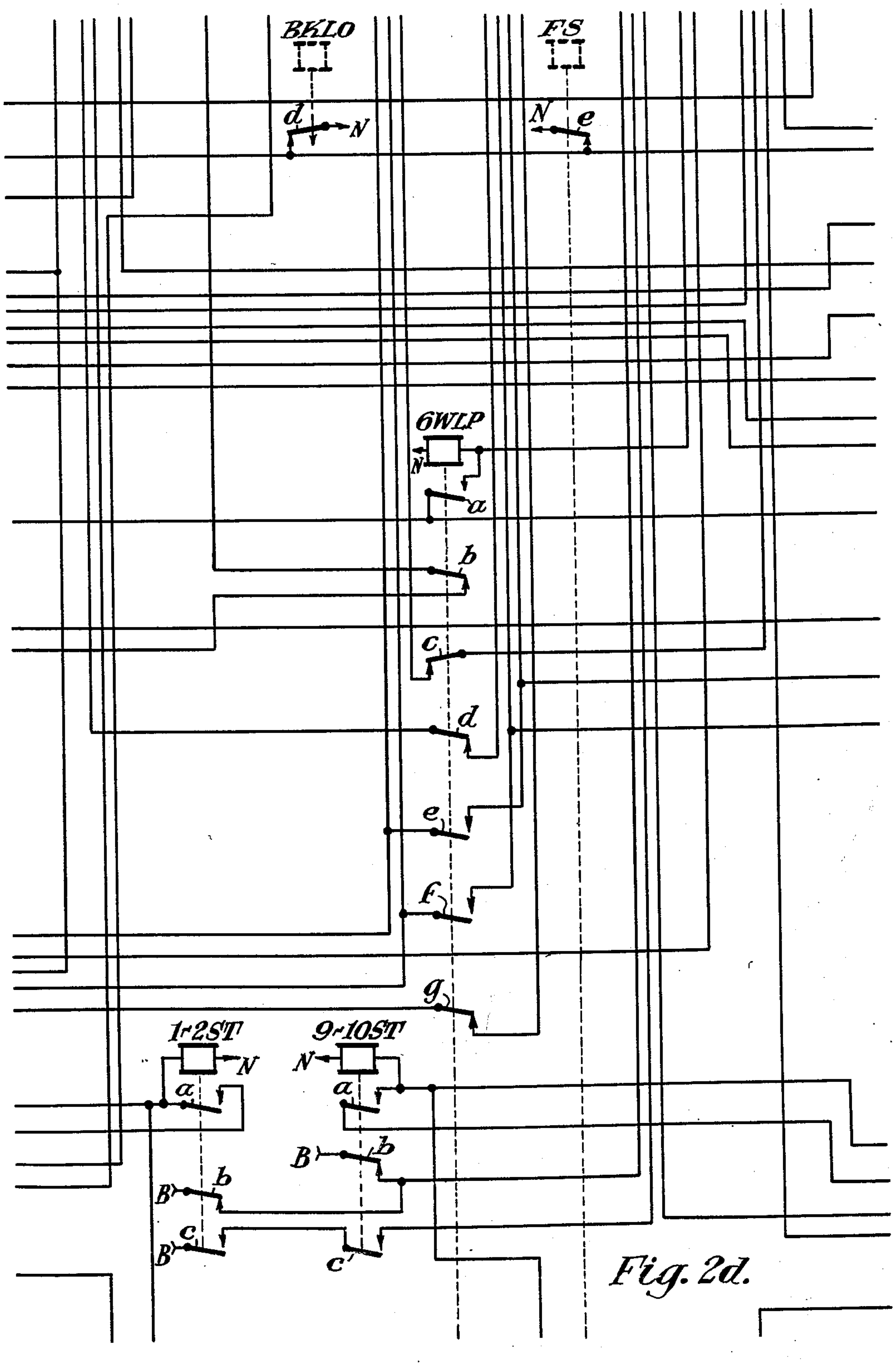
Figure 2E:
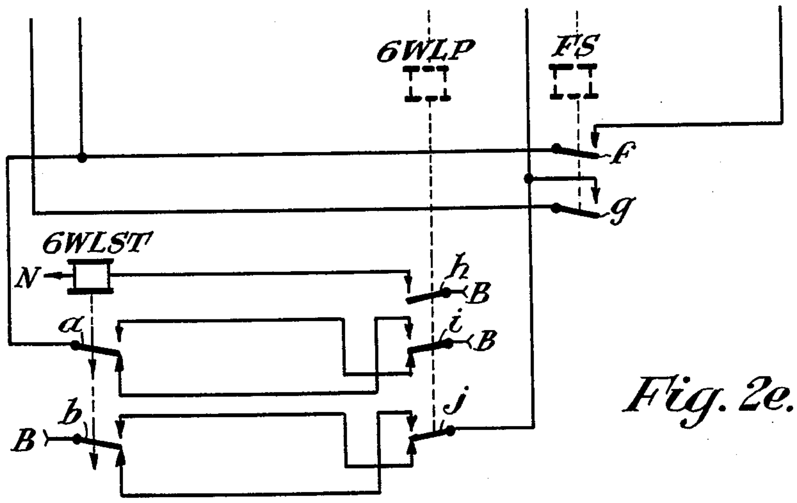

In the accompanying drawings, FIGS. 1*a*, 1*b*, 1*c*, 1*d*, 1*e*, 1*f*, 1*g*, 1*h*, 1*k*, 1*m*, and 1*n*, when placed together in the manner shown in the orientation diagram illustrated by FIG. 3, constitute a diagrammatic view showing one embodiment of my invention as applied to a stretch of single track railway extending between the ends of two passing sidings at each end of the stretch.

Figure 1D:
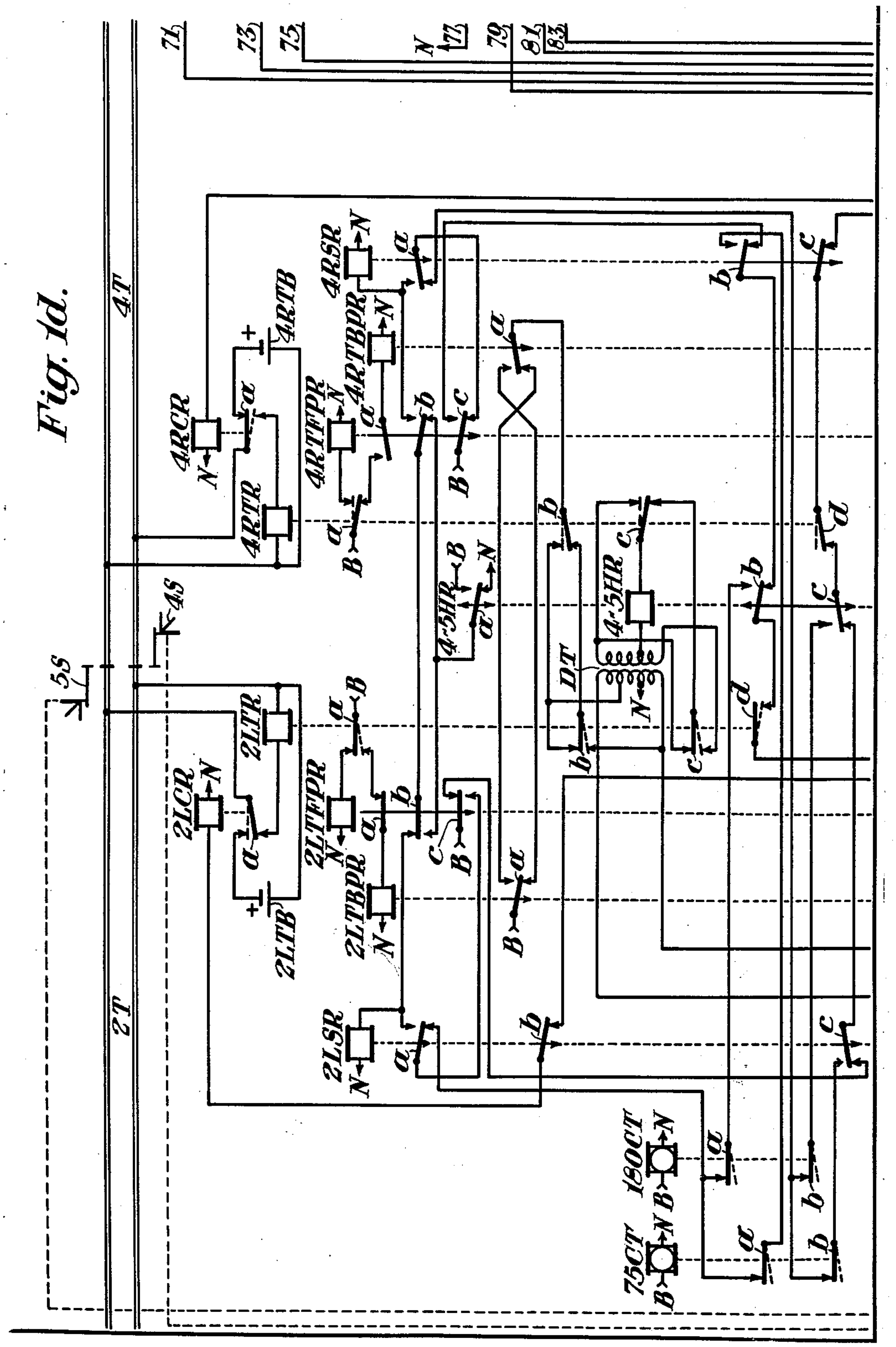
Figure 1E:
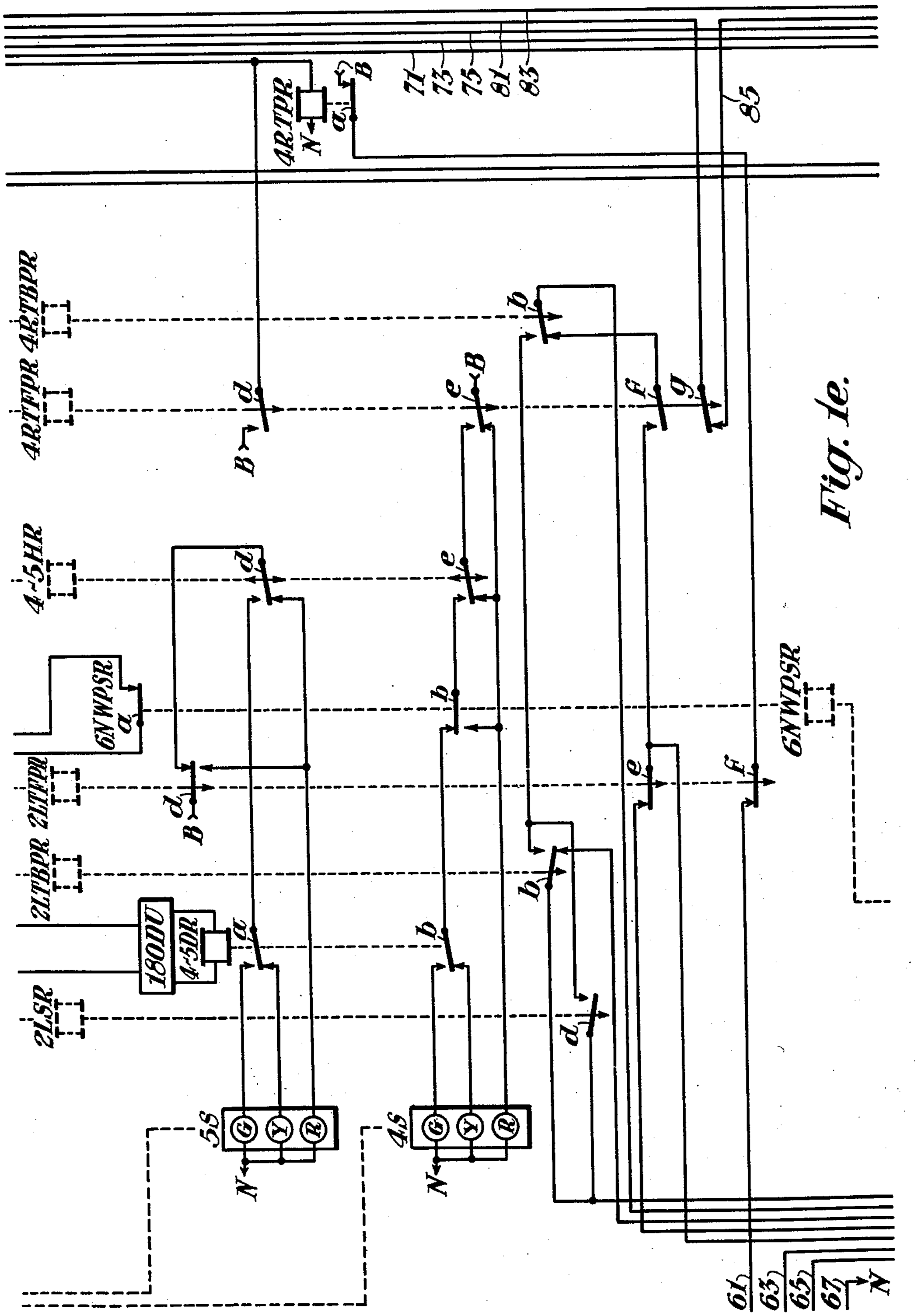
Figure 1F:
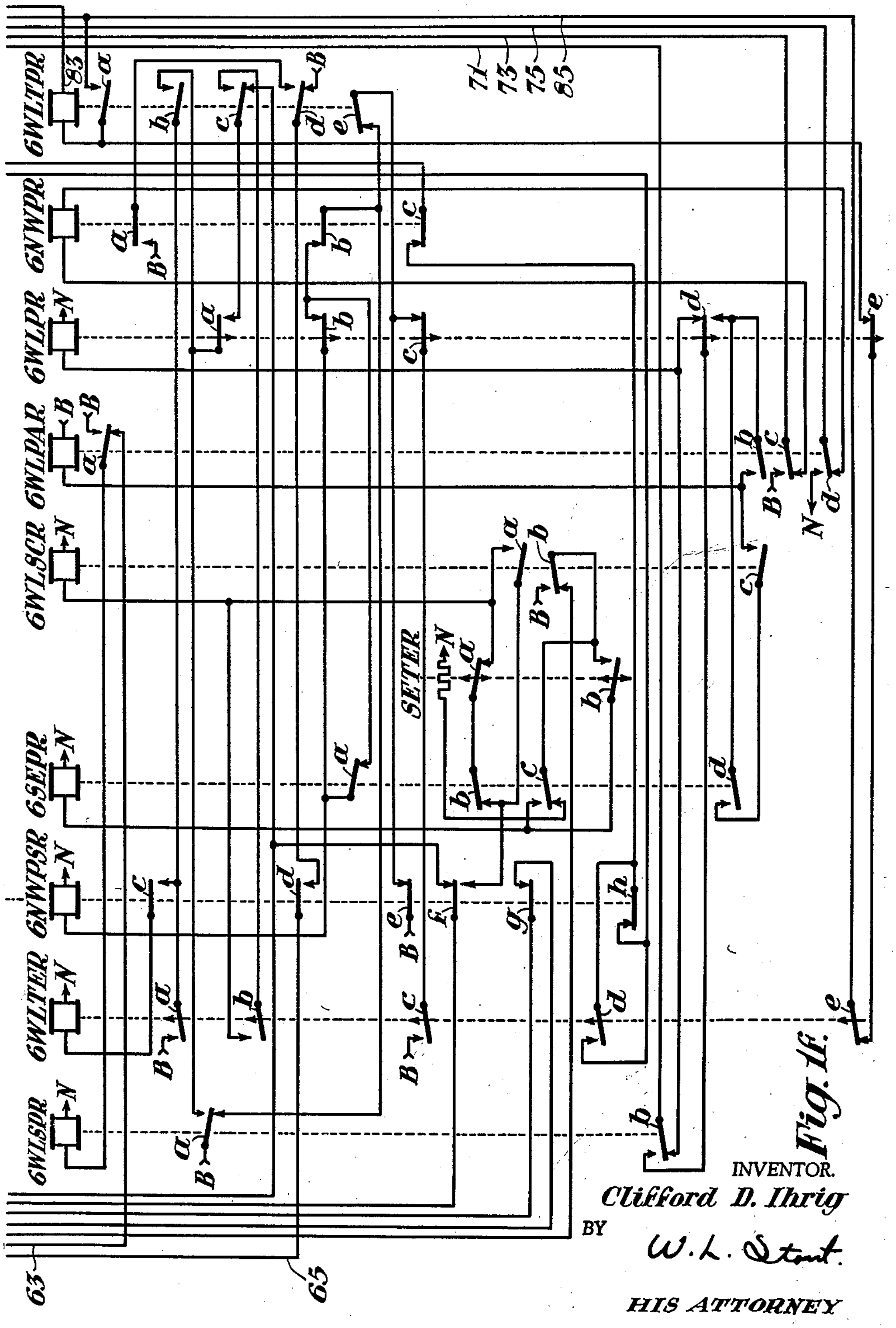
Figure 1G:
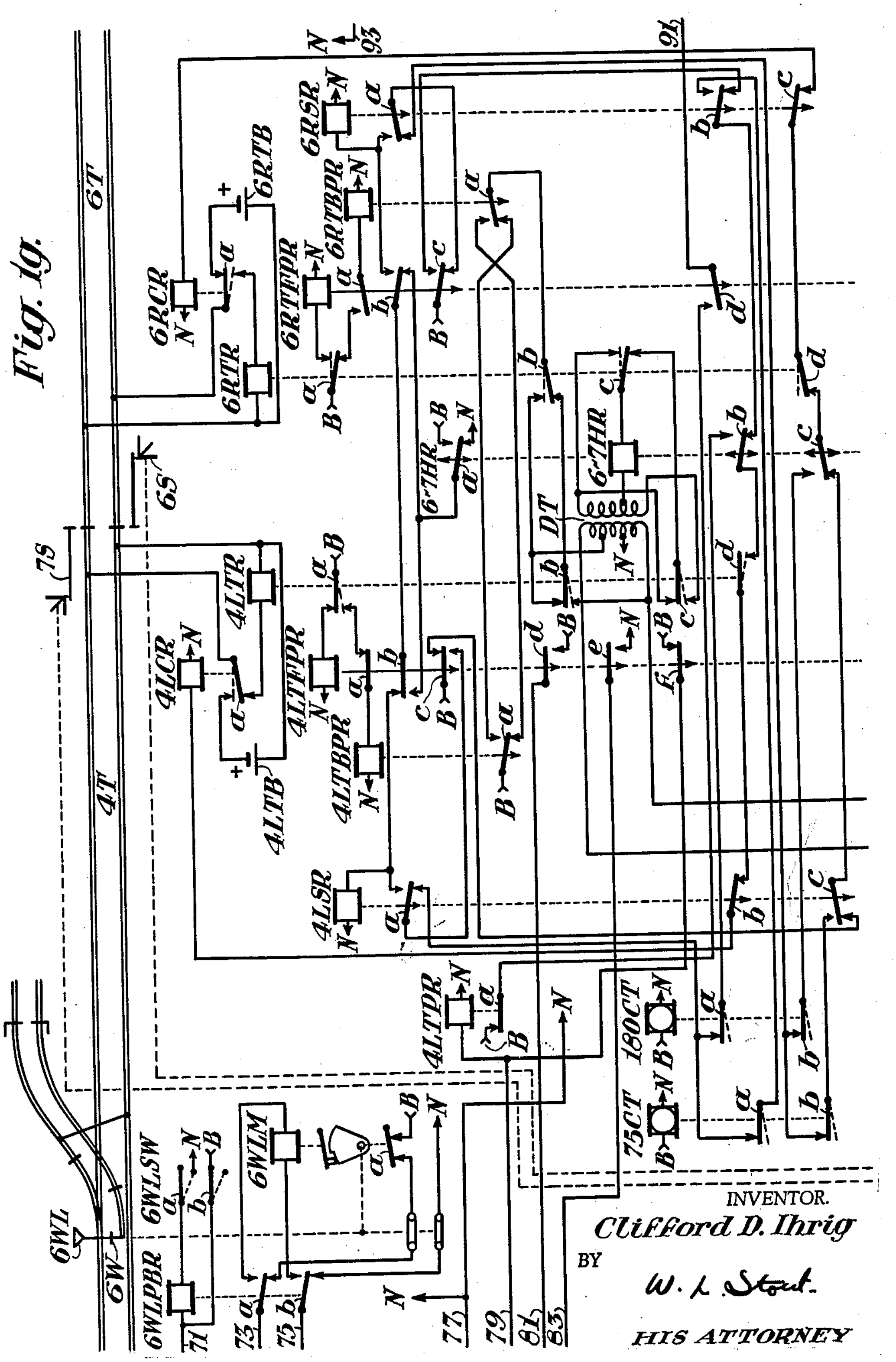
Figure 1H:
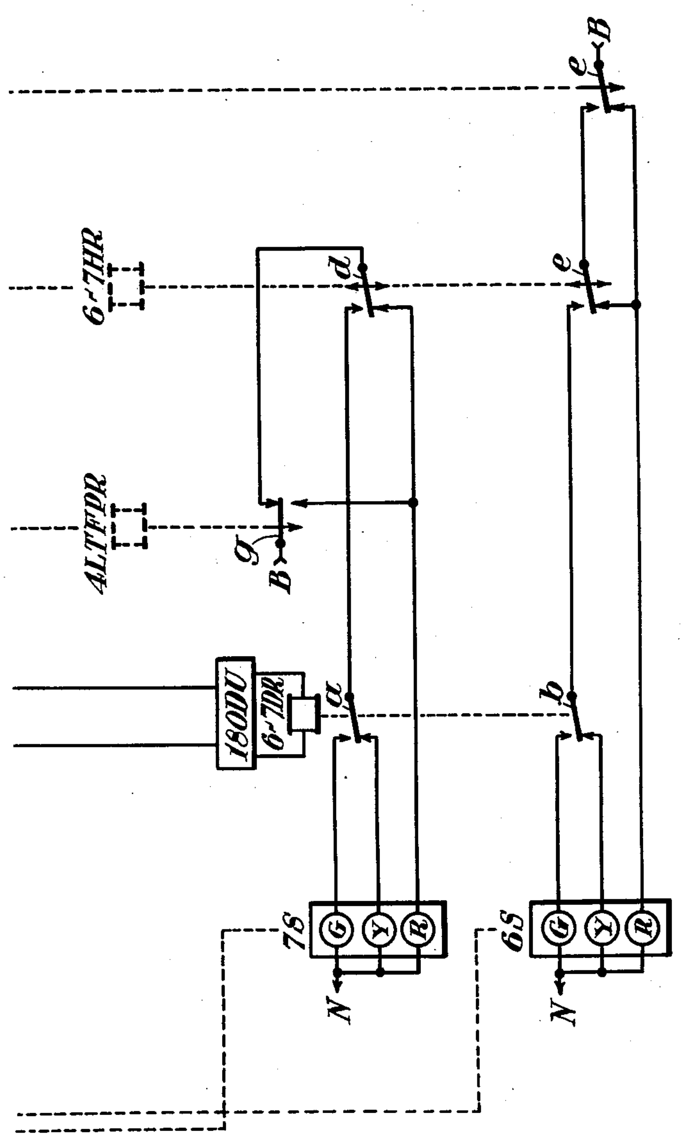
Figure 1K:
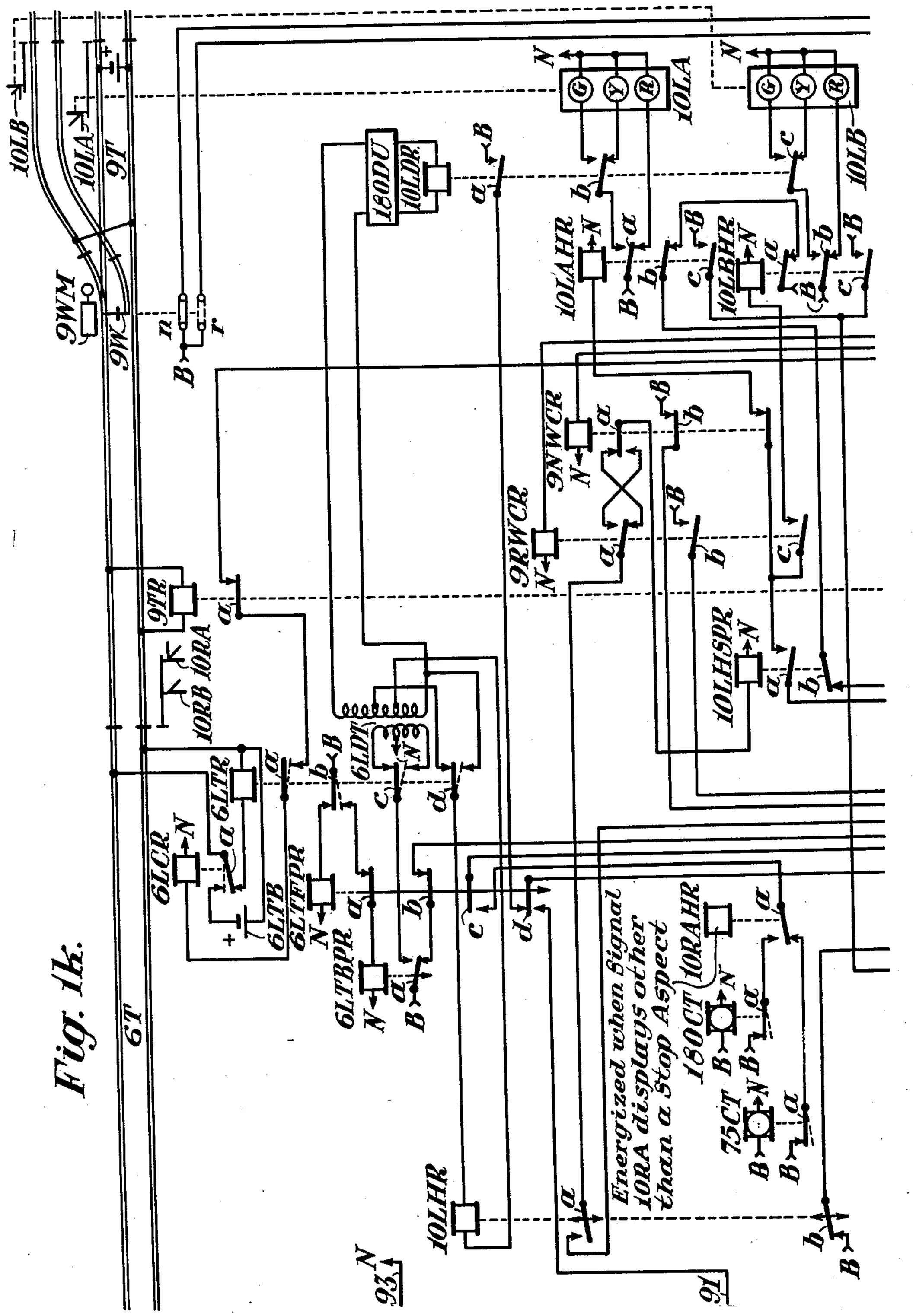
Figure 1M:
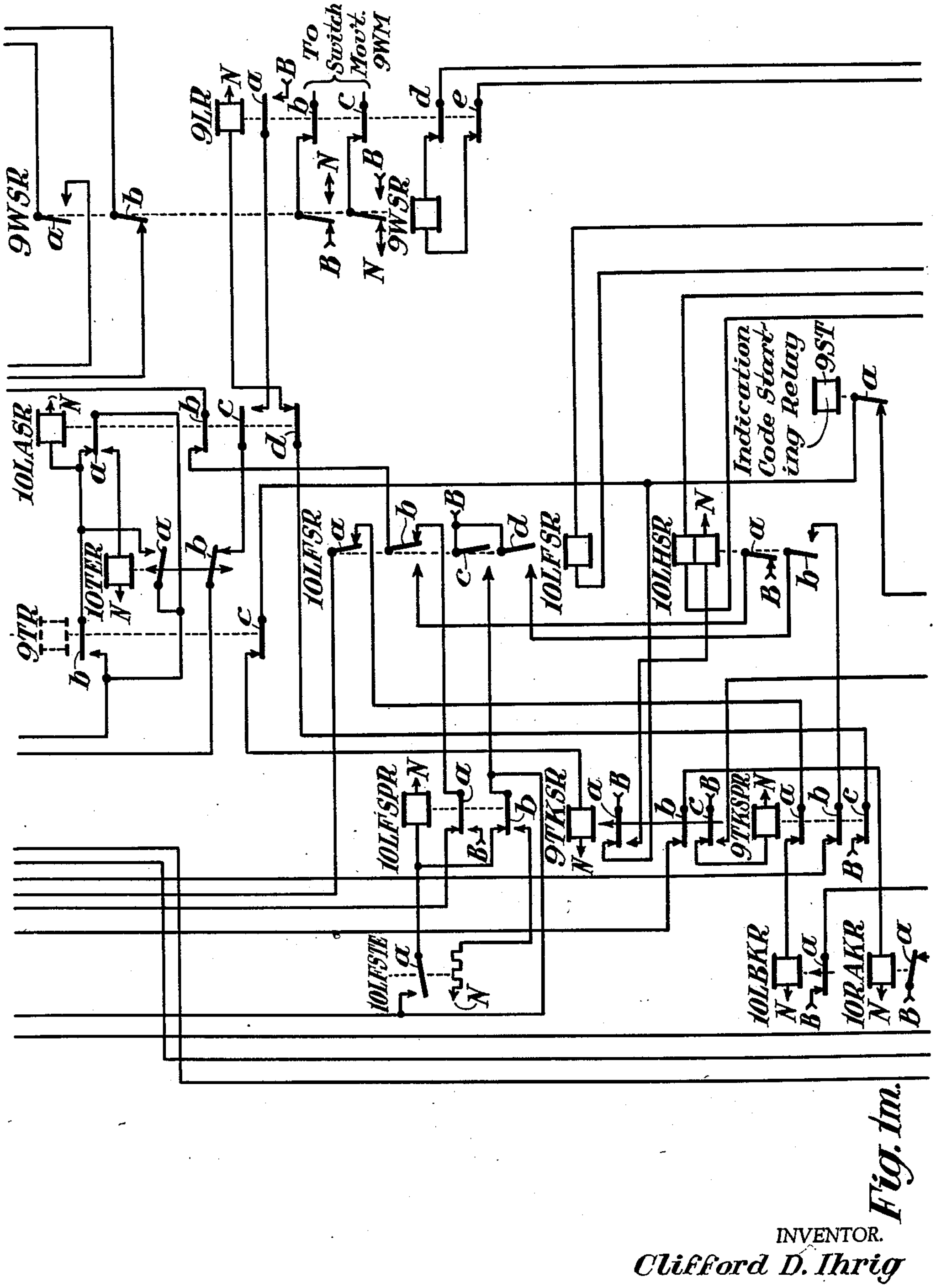
Figure 1N:
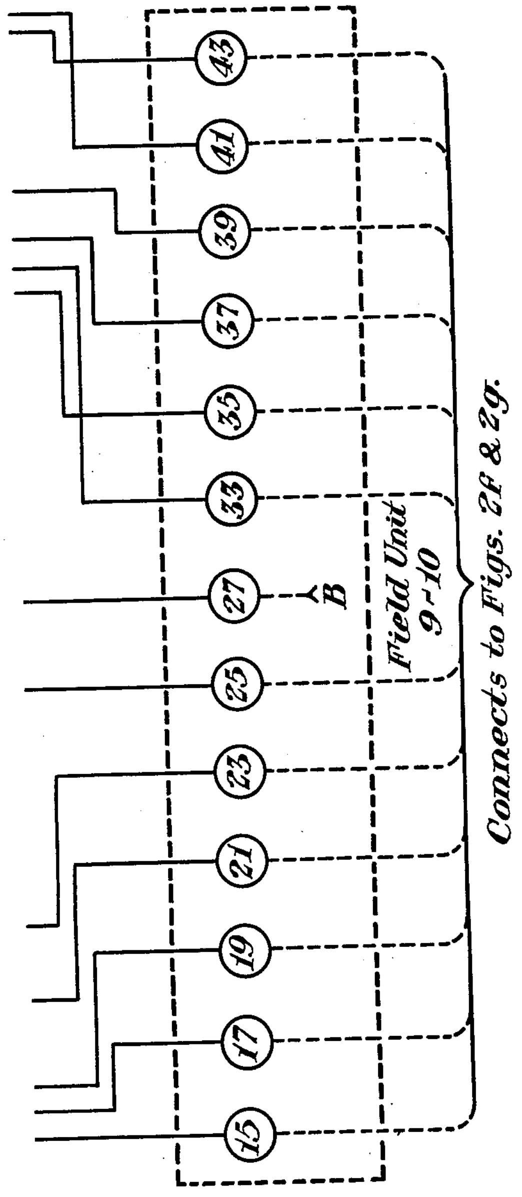
Figure 4:
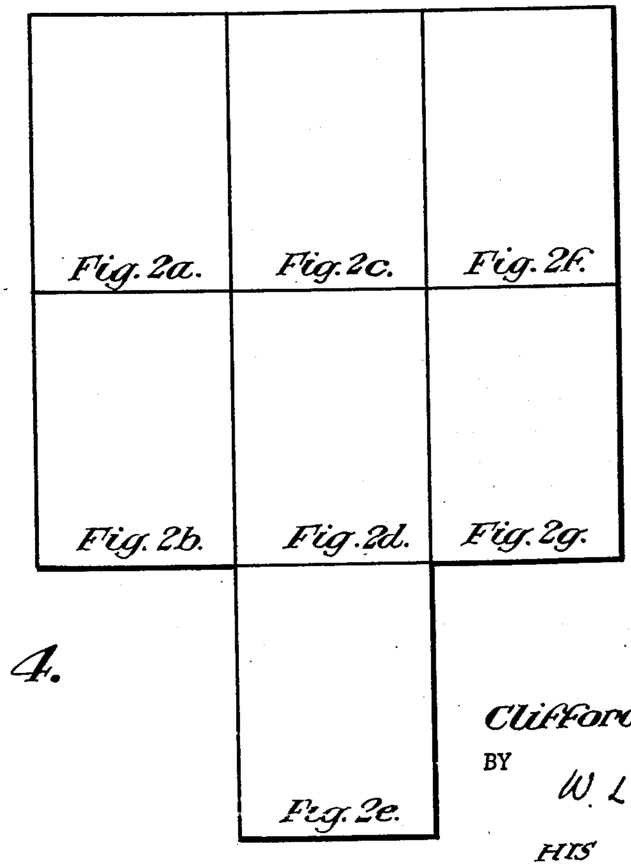
Figure 2F:
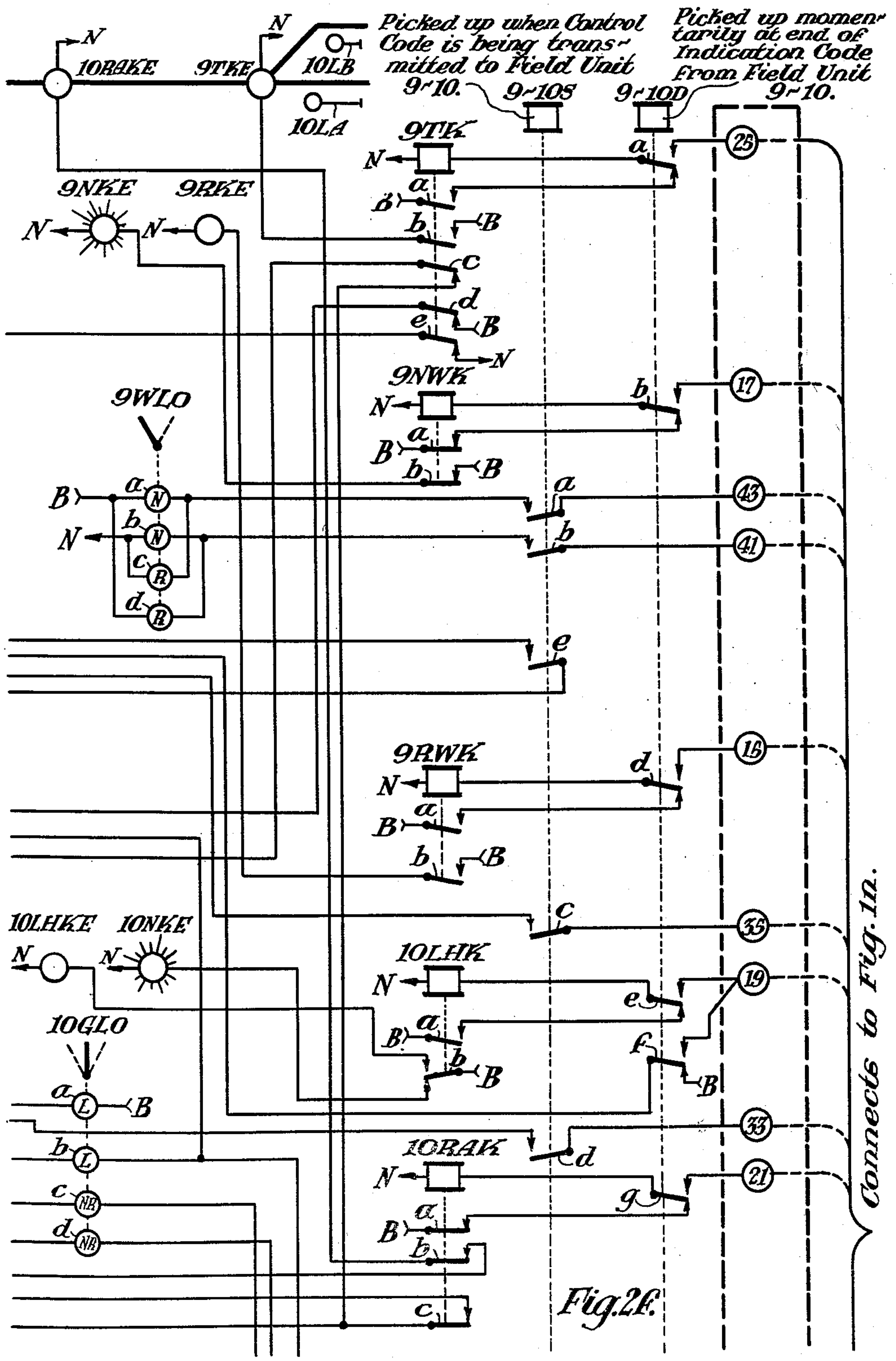
Figure 2G:
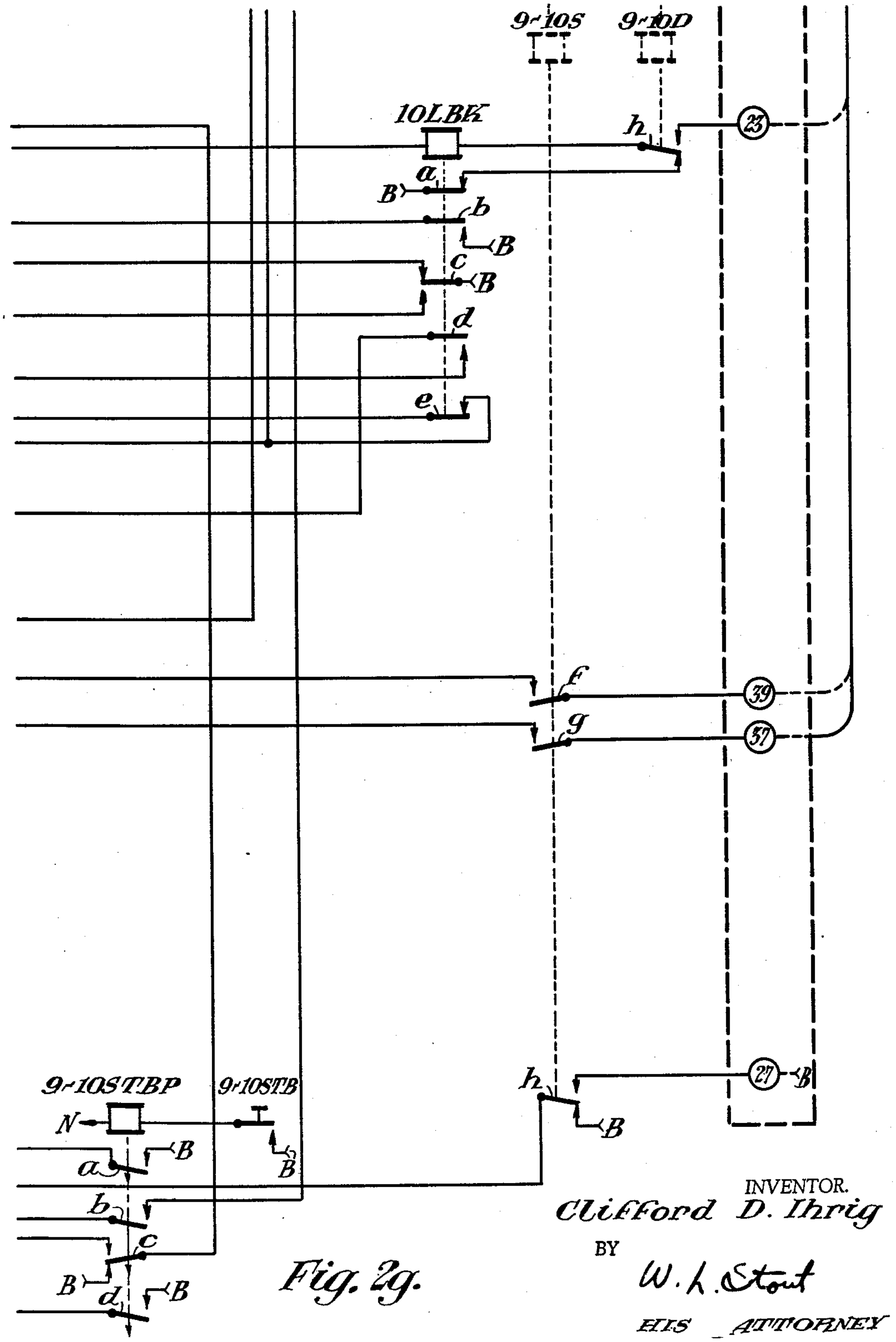

FIGS. 2*a*, 2*b*, 2*c*, 2*d*, 2*e*, 2*f*, and 2*g*, when taken together in the manner shown in the orientation diagram illustrated by FIG. 4, illustrate the diagrammatic circuits for the apparatus located at the control office for the control of the wayside signaling system shown in FIGS. 1*a* through 1*n*.

Similar reference characters refer to similar parts of the apparatus in each of the several views.

Referring first to FIGS. 1*a* through 1*n*, the stretch of track between the passing sidings is divided by means of the usual insulated rail joints into a number of track sections. Each of these track sections is equipped with a track circuit for detecting the occupancy of the section by a train. The sections 1T and 9T at the extreme ends of the single track stretch form detector sections for providing the usual detector locking for preventing the operation of a power operated switch when a train is occupying the section including the switch. These track circuits are of the conventional type in which a track battery is connected across the rails at one end of the section and a track relay, such as relays 1TR and 9TR, is connected across the rails at the other end of the section. The track sections 2T, 4T, and 6T are provided with coded track circuits, as will be subsequently explained in detail. The signals which govern traffic movements through the single track stretch are the entering signals 2RA and 2RB at the left-hand or west end of the stretch, the entering signals 10LA and 10LB at the right-hand or east end of the stretch, and, in addition, the intermediate signals 4S, 5S, 6S, and 7S. Each of these wayside signals may be of any suitable type, and are here shown as color light signals having a green lamp G, a yellow lamp Y, and a red lamp R, which when lighted indicated clear, caution, and stop, respectively.

Each of the sections 2T, 4T, and 6T is actually provided with two track circuits, one eastbound and one westbound, each of which includes at one end a code following track relay designated by the reference character TR with a suitable prefix, and a source of track circuit energy, conveniently shown as a battery, at the other end. The track circuits could obviously be of the alternating current type, and my invention contemplates such track circuits, the direct current type being shown only for purposes of simplicity. The track circuit current is coded under the influence of traffic conditions, or as initiated by the operator at the central control office. Depending upon the direction of traffic movement, only one or the other track circuit is effective at any one time, as will be subsequently made clear. The reference characters for control relays involved in an eastbound move include the prefix R for right-hand, and those for relays which control westbound moves include the prefix L for left-hand, in order to make the circuits and disclosure more readily understandable.

In the interests of simplifying the disclosure, there is shown and described a system which employs but two code rates, these comprising direct current periodically interrupted at the rate of 75 times per minute to provide a caution aspect on the signals and 180 times per minute for providing a clear aspect on the signals. The coding of the energy which is supplied to the track circuits is controlled by means of suitable code transmitters, illustrated by conventional symbols and designated by the reference characters 75CT and 180CT. These units are constructed, in a manner well known in the art, to operate their contacts recurrently at the rates of 75 and 180 times per minute when the operating windings of the code transmitters are supplied with energy. It is to be understood that in the event cab signal apparatus on the trains moving through the stretch is to be controlled by the operation of the signaling system, alternating current energy coded over contacts controlled by these code transmitters may be superimposed upon the direct current track circuits, in a manner well known in the art. Following train movements may be made throughout the stretch since directional stick relays are provided at the various intermediate locations, and after having once established traffic in a given direction, no further action on the part of the control operator other than the clearing of the entering signal to the stretch is required to permit entry of a following train.

It is to be understood that the office and field stations, one such field station being located at each end of the single track stretch, are connected over a pair of line wires, not shown, by a code communication system which may be of the type shown in Letters Patent of the United States No. 2,229,249, issued January 21, 1941, to Lloyd V. Lewis, for Remote Control Systems, or in Letters Patent of the United States No. 2,411,375, issued November 19, 1946, to Arthur P. Jackel, for Remote Control Systems, or as described in detail in Manual 506A, published October 1950 by The Union Switch and Signal Company, and entitled Time Code Control System.

Consideration of the detailed mode of operation of the code communication system is not needed for an understanding of this invention and it is deemed sufficient to point out that a field station is provided at each end of each track stretch to be controlled. Coding units are provided at the office and at each field station and are connected by a pair of line wires, not shown, over which control codes are at times transmitted from the office to a selected field station as a result of the operation of suitable code starting circuits in the control machine. At other times, indication codes are transmitted over the same line wires from the different field stations to the office without interference. Each code includes a distinctive code call by means of which one station only is selected to effect temporary establishment of communication channels between the office and station. Consequently the different stations, for the different panels on the office machine, are not selected at the same time, and the same channels provide communication at different times with all of the stations. In order to simplify the explanation of the invention, the channels are illustrated herein as separate direct wire circuits extending between the office and field stations, as designated by similarly numbered terminals on the boxes indicated by the dotted lines as comprising the office and field stations, with only those relays involved in the code system shown which are necessary for an understanding of the invention.

The office and the several wayside locations are each provided with a suitable source of direct current energy, which may be a low voltage battery, of proper size and capacity. However, since the use of such sources is well known, only the positive and negative terminals thereof are shown in the drawings, designated by the reference characters B and N, respectively. Slow acting relays, i.e., slow release and/or slow pick up, are designated in a conventional manner by vertical arrows, pointing down or up, respectively, drawn through the movable portion of the relay contact symbols.

I shall first describe the general organization of the apparatus shown on the accompanying drawings which embodies my invention, and shall thereafter describe in detail the operation of the apparatus under various traffic conditions.

The apparatus located at the entering ends of the single track stretch, that is, the ends of the passing sidings, is generally similar in nature, and symmetrical in organization, except that the circuits for a given direction are reversed for the two ends of the single track stretch. Referring now to the appaartus located at the entrance end of the stretch at the west or left-hand end thereof, there is provided, as described hereinbefore, a detector track section 1T, which includes the track switch 1W. Track switch 1W is operated by a suitable power switch movement 1WM, the details of which are not shown, since it may be any one of a number of well-known types. Operation of the power switch is controlled by a switch stick relay such as relay 1WSR, which governs the supply of energy to switch movement 1WM to operate the switch to its normal or reverse position, in accordance with the manner in which traffic is to move over the switch. A switch locking relay, such as relay 1LR, is provided to insure that the switch cannot be operated at times when traffic conditions are such that its operation would be hazardous to train movements. Switch correspondence relays, such as the relays 1NWCR and 1RWCR, which check the correspondence between the position of the track switch and the control relay, are provided to insure that the switch is properly positioned for train movements. The wayside signals are governed by suitable signal control relays, such as relays 2RAHR and 2RBHR, which govern the signals 2RA and 2RB, respectively. The control circuits for signals 2LA and 2LB, which comprise the leaving signals for the single track stretch, are not shown, since these signals may be controlled in any conventional manner, and the details of the control circuits employed form no part of my invention.

The coded track circuit apparatus at the left-hand end of the stretch includes a code transmitting relay 2RCR, a code following track relay 2RTR, a front contact track repeater relay 2RTFPR, a back contact track repeater relay 2RTBPR, a signal control relay 2RHR, and a clear control relay 2RDR. The latter two relays are governed by decoding apparatus of a conventional type including a decoding transformer 2RDT and a 180 code rate decoding unit 180DU, as will be subsequently explained. A supply of coded energy for the operation of code transmitting relay 2RCR is obtained over contacts of code transmitters 180CT and 75CT, as selected by a contact of a signal control relay 2LAHR which is energized when signal 2LA displays other than a stop aspect. A signal locking relay 2RASR and an associated time element relay 2TER are provided for checking that signals 2RA and 2RB are at stop and that, having once been cleared, a train has either accepted the signals and moved into section 1T or a suitable time interval, as determined by operation of relay 2TER, has elapsed before relay 2RASR is reenergized. For controlling the direction of traffic movement through the single track stretch, a traffic stick relay 2RFSR is provided which is governed from the control office by suitable circuits to be subsequently explained in detail. Additionally, a signal control stick relay 2RHSR, which is also controlled from the control machine, is provided to govern the clearing of entering signals 2RA and 2RB.

The apparatus further includes a traffic stick repeater relay 2RFSPR with an associated time element relay 2RFSTE, a track indication stick relay 1TKSR, a track indication stick repeater relay 1TKSPR, a block indication relay 2RBKR, an approach indication relay 2LAKR, a switch lock stick relay 6WLSR, a switch lock indication relay 6WLKR, and an indication code starting relay 1ST, which is associated with the field unit 1—2 and forms a portion of the code system. The detailed circuits for the control of code starting relay 1ST are not shown, but this relay is controlled in such manner that its contacts are operated when an indication code is to be sent into the office and are not restored until the code transmission has been started.

As previously stated, the apparatus at the east or right-hand end of the stretch is similar to that described above for the left-hand end of the stretch, with the exception that it is not necessary to provide, at the opposite end of the stretch, relays for controlling or indicating the operation of the switch lock. Accordingly, there is no counterpart at the east end of the stretch for relays 6WLSR and 6WLKR, together with their associated circuits.

The apparatus at a typical intermediate location, such as that represented by signals 6S and 7S (FIGS. 1*g*, 1*h*), includes code transmitting relays 4LCR and 6RCR, code following track relays 4LTR and 6RTR, front and back contact slow release track repeater relays 4LTFPR, 4LTBPR, 6RTFPR, and 6RTBPR, directional stick relays 4LSR and 6RSR, and, for signal control, decoding relays 6—7HR and 6—7DR, together with the associated decoding transformer DT and decoding unit 180DU. The transmission of the trackway code is governed by the code transmitters 75CT and 180CT of the type furnished at other locations. The track repeater relay 4LTPR at signal location 6S—7S is employed in connection with approach indication circuits as will be subsequently described.

At the switch lock location (upper left, FIG. 1*g*), there is shown a track switch 6W which has connected thereto an electric switch lock 6WL, which may be any one of the conventional forms well known in the railway signaling art which include an electromagnetic locking device to prevent the switch from being operated unless the magnet has been energized to release the mechanical locking. As here shown, the switch lock magnet 6WLM controls an armature which, when picked up, removes a locking dog from a suitable quadrant which, when reversed, allows the hand-throw switch to be operated. A contact operated by the switch lock armature is provided in the switch lock indication circuit arrangement, as well as the contacts operated directly by the switch. A circuit switch for operation by the trainman to indicate to the dispatcher that an unlock is desired to provided in the form of a double contact switch designated by the reference character 6WLSW, but it will be understood that any type of suitably operated contacts may be employed, for example, such as contacts actuated by the removal of a padlock from the electric switch lock. A transfer relay 6WLPBR is provided at the switch lock location for interchanging the connections between the switch lock magnet 6WLM and the switch indication and switch lock indication contacts.

The major portion of the apparatus involved in the control of the electric switch lock 6WL is located at the intermediate signal location 4S—5S (FIGS. 1*d*, *e*, *f*). The apparatus at this location for the control of the coded track circuits and the signals is substantially similar to that described for the intermediate signal location 6S—7S, and need not be described now in detail. The relays involved in the control of the switch lock include a switch lock stick repeater relay 6WLSPR, a switch lock time element relay 6WLTER, a normal switch repeater stick relay 6NWPSR, a steady energy repeater relay 6SEPR, a steady energy time element relay SETER, a switch lock stick control relay 6WLSCR, a switch lock repeater relay 6WLPR, a switch lock repeater auxiliary relay 6WLPAR, a normal switch repeater relay 6NWPR, and a switch lock track repeater relay 6WLTPR. The detailed operation of the relays and circuits governed thereby which enter into the control of switch lock 6WL will be made clear as the description progresses.

Considering now the apparatus at the control point, as shown in FIGS. 2*a* through 2*g*, there is provided on the control machine a miniature diagram of the stretch of railway track involved, with suitable indication lamps located on or near the diagram to provide indications to the operator of the conditions in the field. As shown, the lamps associated with the track model include track indication lamps 1TKE and 9TKE which when lighted indicate the occupancy of the detector sections at the west and east ends of the stretch, respectively, the approach indication lamps 2LAKE and 10RAKE which indicate the presence of a train in the single track stretch, and the traffic direction lamps LFKE and RFKE which, by means of suitable arrows or other designation, indicate, when lighted, the direction in which traffic is established for train movements through the single track stretch.

Also provided on the control machine are a plurality of levers and push buttons for governing the various functions in the field, such as the switch levers 1WLO and 9WLO, the signal levers 2GLO and 10GLO, the switch lock control lever 6WLO, and the code starting buttons 1—2STB and 9—10STB. Associated with the switch control levers are indication lights 1NKE, 1RKE, 9NKE, and 9RKE, which are lighted to indicate the normal or reverse position of the associated track switch. Indication lamps are also provided for each of the signal levers, such as the lamps 2NKE and 2RHKE associated with lever 2GLO, and lamps 10NKE and 10LHKE associated with lever 10GLO. These lamps when lighted indicate that the associated wayside signal is at stop or has been cleared for a train movement. Two further indication lamps, 6WLNKE and 6WLSKE, are associated with the switch lock control lever to provide indications to the operator of the conditions of the electric switch lock 6WL at the field location.

Associated with each of the office coding units are a plurality of indication relays, such as relays 1TK, 1NWK, 1RWK, 2RHK, 2LAK, 2RBK, 6WLSK, and 6WLRK. These relays are energized by the operation of the code communication system with the corresponding delivery relay, such as relay 1—2D which picks up momentarily at the end of an indication code from field unit 1—2, connecting the windings of the indication relays to the coding unit so that appropriate relays are picked up or released in accordance with the field indications which they represent. Station selection relays, such as relay 1—2S which is picked up when a control code is transmitted to field unit 1—2, serve to connect the office coding units to the contacts of suitable relays and control levers in order to establish a communication channel to the field which will cause the operation of the desired control function.

The indication and control relays, control levers, and the connections thereof to the office coding unit for the apparatus at the east end of the stretch are similar to that described for the panel 1—2 for the west end of the stretch, with the exception that the switch lock control and indication circuits are not provided at this point since this control is established through the field station 1—2 alone. The apparatus in the control machine also includes a magnetic stick traffic relay 2—10F, a block indication lockout relay BKLO, a traffic stick relay FS, a switch lock repeater relay 6WLP, a switch lock starting relay 6WLST, signal control relays 2RG and 10LG, signal control stick relays 2RGS and 10LGS, starting push button repeater relays 1—2STBP and 9—10STBP, and starting relays 1—2ST and 9—10ST. A relay MP (FIG. 2*b*), also provided in the code communication system, is picked up when a control code is being transmitted to either of the field units 1—2 or 9—10. The control circuits for relay MP are not shown since they form a part of the conventional code communication system.

Having thus described the various components of the signaling system, I shall now describe the apparatus in the condition in which it is shown in drawings, namely, with the entering sinals at each end of the single track stretch at stop, with the section unoccupied, and with the traffic direction in the stretch set up from west to east.

Considering first the condition of the equipment at the control office, switch levers 1WLO and 9WLO are assumed to be in their normal position, and switch indication relays 1NWK and 9NWK to be picked up, so that circuits are established over front contacts *b* of these relays to supply energy to the normal switch indication lamps. Signal levers 2GLO and 10GLO are considered to be in their center or normal position, and signal indication relays 2RHK and 10LHK are released at this time, so that circuits are established over back contacts *b* of these relays to supply energy to the normal signal indication lamps 2NKE and 10NKE. With switch lock 6WL in its normal condition in the field, and control lever 6WLO in its normal position at the office, indication relays 6WLSK and 6WLRK are both deenergized. A circuit is established over back contact *b* of relay 6WLSK for supplying energy to the normal switch lock indication lamp 6WLNKE. Traffic relay 2—10F has its contacts positioned to their right-hand or reverse position, and in this position, reverse contact *a* of relay 2—10F establishes an obvious circuit for supplying energy to traffic indication lamp RFKE, which indicates that traffic is set up in the stretch to move from west to east. The various track and approach indication lamps are all dark at this time.

Referring now to the single track stretch at the left-hand end thereof, signal control relays 2RAHR and 2RBHR are both released. Back contact *a* of relay 2RAHR establishes a circuit for supplying energy to the red lamp R of signal 2RA, and back contact *b* of relay 2RBHR establishing a circuit for supplying energy to the red lamp R of signal 2RB. Since switch 1W is in its normal position, a circuit is established for supplying energy to switch correspondence relay 1NWCR, this circuit including a normal contact *n* governed by the switch movement and normal contact *b* of switch control relay 1WSR, so that relay 1NWCR is energized and its contacts are picked up while relay 1RWCR is released at this time.

Signal locking relay 2RASR is energized, with the system inactive, over a stick circuit which includes back contact *a* of relay 2RBHR, back contact *b* of relay 2RAHR, back contact *b* of relay 2RHSPR, and front contact *a* of relay 2RASR. Relay 1TKSR is energized at this time by a circuit which includes contacts of relays in the field code unit 1—2, not shown, terminal 27, normal contact *a* of code starting relay 1ST, front contact *c* of relay 1TR, and the winding of relay 1TKSR. Relay 1TKSR is also energized by its stick circuit which includes its own front contact *a* and front contact *c* of relay 1TR. With relay 1TKSR picked up, its front contact *c* establishes an obvious circuit for energizing relay 1TKSPR. Relay 2RBKR is released and relay 2LAKR is picked up, as will be explained later.

Under the existing conditions, the contacts of relays 2RHSR and 2RFSR occupy their normal and reverse positions, respectively. A circuit is established over contacts of these relays for energizing code transmitting relay 2RCR with steady energy, which circuit includes normal contact *a* of relay 2RHSR, reverse contact *b* of relay 2RFSR, front contact *b* of relay 2RASR, front contact *a* of relay 1TR, back contact *a* of relay 2RTR, and the winding of relay 2RCR. With energy steadily supplied to the winding of relay 2RCR, front contact *a* of this relay connects track battery 2RTB across the rails of section 2T at the west end thereof. Since relay 2RTR is disconnected from the rails of section 2T by back contact *a* of relay 2RCR, the contacts of relay 2RTR will remain in their released position, with the result that relays 2RTFPR, 2RTBPR, 2RHR, and 2RDR will all be released. It will therefore be seen that, at this time, track section 2T is supplied with steady energy at the west or left-hand end of the section. It is to be noted, although its contacts are not included in any circuits active under the existing conditions, that relay 2RFSPR is energized by its stick circuit including its own front contact *b* and, in multiple, reverse contact *c* of relay 2RFSR and back contact *b* of relay 2RHR.

At the right-hand end of section 2T, that is, at signal location 4S—5S, relay 2LCR is released at this time so that its back contact *a* connects the winding of track relay 2LTR across the rails of section 2T. With relay 2LTR thus continuously energized, its contacts are continuously picked up. With front contact *a* of relay 2LTR closed, an obvious circuit is established for energizing relay 2LTFPR. However, relay 2LTBPR will remain deenergized, since the circuit for energizing this relay is open at back contact *a* of relay 8LTR, even though front contact *a* of relay 2LTFPR is closed. Relays 2LSR, 4RTR, 4RTFPR, 4RTBPR, 4RSR, 4—5HR, and 4—5DR are released. The relays associated with the control of the switch lock are deenergized at this time with the exception of relays 6NWPSR, 6WLPR, and 6NWPR. Relay 4RTPR, which is involved in the control of the block indication circuits, is energized, as will be discussed shortly.

With relay 2LTFPR picked up and relay 2LSR released, a circuit is established for supplying steady energy to the winding of code transmitting relay 4RCR, which circuit may be traced from terminal B at front contact *c* of relay 2LTFPR, over back contact *c* of relay 2LSR, back contact *c* of relay 4—5HR, back contact *d* of relay 4RTR, back contact *c* of relay 4RSR, front contact *h* of relay 6NWPSR, front contact *c* of relay 6NWPR, and the winding of relay 4RCR to terminal N. With front contact *a* of relay 4RCR closed, track battery 4RTB is connected across the rails of section 4T at the left-hand end thereof, and relay 4RTR is continuously deenergized. Thus the steady energy present in section 2T at this time feeding from the left-hand or west end of the section causes steady energy to be retransmitted into the track rails of section 4T at the left-hand end thereof.

At signal location 4S—5S, the red lamp R of signal 4S is supplied with energy at this time by a circuit including back contact *e* of relay 4RTFPR, so that this signal displays a red or stop aspect. Similarly, the red lamp R of signal 5S is supplied with energy by a circuit including front contact *d* of relay 2LTFPR and back contact *d* of relay 4—5HR, so that signal 5S also displays a red or stop aspect.

At signal location 6S—7S, the steady energy supplied over the rails of section 4T from the lefthand end thereof is supplied to the winding of relay 4LTR over back contact *a* of relay 4LCR which is released at this time. With front contact *a* of relay 4LTR closed, relay 4LTFPR is energized, but relay 4LTBPR remains deenergized since back contact *a* of relay 4LTR interrupts its energizing circuit. Relays 4LSR, 6RTR, 6RTFPR, 6RTBPR, 6RSR, 6—7HR, and 6—7DR are all released at this time. Relay 4LTPR, which is involved in the block indication circuit, is energized, as will be explained subsequently. Relay 6RCR is steadily energized by the circuit traced from terminal B at front contact *c* of relay 4LTFPR, over back contact *c* of relay 4LSR, back contact *c* of relay 6—7HR, back contact *d* of relay 6RTR, back contact *c* of relay 6RSR, and the winding of relay 6RCR to terminal N. With front contact *a* of relay 6RCR continuously closed, relay 6RTR is deenergized and track battery 6RTB is continuously connected across the rails of section 6T to supply steady energy which feeds over the rails to the east end of the section. The red lamps of signals 6S and 7S are supplied with energy over obvious circuits similar to those traced for the red lamps of signals 4S and 5S. Thus signals 6S and 7S also display red or stop aspects at this time.

At the right-hand or east end of the stretch, the steady energy supplied over the rails of section 6T flows through the winding of relay 6LTR, since back contact *a* of relay 6LCR is closed at this time. Accordingly, the contacts of relay 6LTR are picked up, back contact *a* of this relay maintaining relay 6LCR deenergized. Relay 6LTFPR is energized over front contact *b* of relay 6LTR, while the corresponding back contact *b* interrupts the control circuit for relay 6LTBPR which thus remains released. Relays 10LHR and 10LDR are released, since contacts *c* and *d* of relay 6LTR are continuously picked up. With track switch 9W in its normal position, the normal contact *n* operated by switch movement 9WM is closed and the reverse contact *r* open, so that the circuit for energizing relay 9NWCR is completed over normal contact *b* of relay 9WSR which is closed at this time. As a result, relay 9NWCR is picked up while relay 9RWCR is released. Relays 10LAHR and 10LBHR are both released to establish obvious circuits for supplying energy to the red lamps R of signals 10LA and 10LB, respectively. Relay 10LASR is energized by the stick circuit including back contact *a* of relay 10LBHR, back contact *b* of relay 10LAHR, back contact *b* of relay 10LHSPR, and front contact *a* of relay 10LASR. Under the assumed conditions, relay 10LFSR has its contacts operated to their right-hand or reverse position and relay 10LHSR has its contacts in their left-hand or normal position. Relay 10LFSPR is energized by a stick circuit including its own front contact *b* and back contact *b* of relay 10LHR, the multiple connection over normal contact *c* of relay 10LFSR being open. Relays 9TKSR and 9TKSPR are energized in a manner similar to that described for relays 1TKSR and 1TKSPR. Under the conditions illustrated, relay 10LBKR is energized through a circuit including front contact *a* of relay 9TKSPR, reverse contact *a* of relay 10LFSR, front contact *b* of relay 6LTFPR, and back contact *a* of relay 6LTBPR. The circuit for relay 10RAKR, to be more fully described shortly, is presently open at front contact *a* of relay 10LDR.

At signal location 6S—7S, relay 4LTPR is energized over a circuit traced from terminal B at front contact *f* of relay 4LTFPR through the winding of relay 4LTPR to terminal N. Energy is also supplied from terminal B at location 6S—7S over front contact *f* of relay 4LTFPR and line wire 79 to signal location 4S—5S, and thence through the winding of relay 4RTPR at this location to terminal N. This circuit is effective to energize relay 4RTPR since the negative terminals of the local batteries at the various locations are connected together. For example, a common wire designated by the reference character 77 is connected to terminal N at location 4S—5S, at the switch lock location, and at signal location 6S—7S, and, by wire 93, to terminal N at the east end of the stretch. The negative terminal N of the battery at the west end is connected over line wire 67 to terminal N at location 4S—5S and thus to the negative terminals of the other batteries throughout the stretch. At signal location 4S—5S, with front contact *a* of relay 4RTPR and front contact *f* of relay 2LTFPR closed, energy is supplied over line wire 61 to energize relay 2LAKR at the west end of the stretch, the circuit further including back contact *d* of relay 2RTFPR, front contact *b* of relay 1TKSR, and the winding of relay 2LAKR.

Having thus described the condition of the apparatus as shown on the drawings, with the stretch unoccupied and the direction of traffic such as to permit eastbound train movements, it will now be assumed that the operator at the control office desires to clear the signals for an eastbound train to enter the stretch. Accordingly, such operation will now be described together with the operation of the apparatus as the eastbound train enters, moves through, and leaves the single track stretch. The operator at the control point operates signal lever 2GLO to its right-hand position, and actuates starting button 1—2STB to send a control code to the field station 1—2 to clear the entering signal for the eastbound train. It will be assumed that, in this case, the train is approaching on the main track so that switch 1W is to remain in its normal position and signal 2RA is to be cleared. When push button 1—2STB is actuated, repeater relay 1—2STBP picks up momentarily, thereby establishing a circuit for energizing signal control relay 2RG. This circuit may be traced from terminal B at contact *d* of lever 2GLO, closed in the right-hand position, over front contact *c* of relay 1—2STBP, the winding of relay 2RG, and back contact *e* of track indication relay 1TK to terminal N. When relay 2RG picks up, and push button repeater relay 1—2STBP releases, a stick circuit including back contact *c* of relay 1—2STBP and front contact *a* of relay 2RG is established for relay 2RG, so that this relay remains picked up even though lever 2GLO may thereafter be inadvertently returned to its normal position. This is to insure that the signal cannot be placed at stop except by the deliberate manipulation of signal lever 2GLO to its normal position followed by another operation of push button 1—2STB to transmit a control code to restore the signal to stop.

The closing of front contact *a* of relay 1—2STBP completes the energizing circuit for relay 1—2ST which picks up, closing its front contact *a* to establish a stick circuit including back contact *i* of station selection relay 1—2S. Relay 1—2ST will thus remain picked up until the code transmission has reached that portion in which the appropriate field station is selected. With code transmission being in effect, relay MP will also pick up, so that, with relay 2RG picked up, a circuit is shortly established which may be traced from terminal B at front contact *a* of relay MP, over back contact *d* of relay 6WLRK, back contact *g* of relay 6WLP, reverse contact *c* of relay 2—10F, front contact *j* of relay 1—2S (closed after station selection), front contact *b* of relay 2RG, the winding of relay 2RGS, and back contact *e* of relay 1TK to terminal N. When relay 2RGS picks up, it establishes a stick circuit which may be traced from terminal B at back contact *f* of relay 1—2D, over front contact *a* of relay 2RGS, the winding of relay 2RGS, and back contact *e* of relay 1TK to terminal N. Accordingly, relay 2RGS will be maintained energized after the completion of the control code.

When relay 1—2S picks up, at the completion of the code selection for field station 1—2, a circuit is established for reversing the contacts of relay 2RHSR at the field location at the west end of the stretch, which circuit may be traced from terminal B at reverse contact *f* of relay 2—10F, over back contact *d* of relay 6WLP, front contact *c* of relay 2RG, front contact *c* of relay 2RGS, front contact *c* of relay 1—2S, through the code communication equipment by way of terminal 35 of panel 1—2 at the office location and terminal 35 of field unit 1—2, the upper winding of relay 2RHSR from right to left, through terminal 33 of field unit 1—2 and terminal 33 of office panel 1—2, front contact *d* of relay 1—2S, and reverse contact *g* of relay 2—10F to terminal N. With current flowing through the upper winding of relay 2RHSR from right to left, the contacts of this relay will be operated from their normal to their reverse positions.

When contact *a* of relay 2RHSR operates to its reverse position, it interrupts the supply of energy to the winding of relay 2RCR, so that contact *a* of this relay releases to interrupt the supply of energy from track battery 2RTB to the rails of section 2T, and to connect the winding of code following track relay 2RTR across the section rails at the left-hand end thereof. At the right-hand end of section 2T, the supply of steady energy to the winding of track relay 2LTR is interrupted and this relay releases its contacts. After a short time interval, the contacts of relay 2LTFPR will also release and front contact *c* of this relay interrupts the supply of energy to the winding of relay 4RCR, so that contact *a* of relay 4RCR disconnects track battery 4RTB from the section rails at the left-hand end of section 4T and connects the winding of code following track relay 4RTR across the rails at this point.

In a similar manner, the interruption of the supply of steady energy to the winding of relay 4LTR at the right-hand end of section 4T results in the release of the contacts of this rlay followed by the subsequent release of the contacts of relay 4LTFPR. Front contact *c* of this latter relay interrupts the supply of energy to the winding of relay 6RCR, which in turn disconnects track battery 6RTB from the rails of section 6T and connects the winding of code following track relay 6RTR across the rails. At the right-hand end of section 6T, the interruption of the supply of energy to the winding of relay 6LTR results in the release of the contacts of this relay followed by the subsequent release of the contacts of relay 6LTFPR.

A circuit is now established for supplying coded energy to the winding of relay 6LCR, the code rate of this energy being dependent upon whether or not signal 10RA is at stop or has been cleared for a train to move out of the single track stretch. Assuming that signal 10RA is cleared, front contact *a* of relay 10RAHR will be closed, and a circuit is established for energizing the winding of relay 6LCR at the code rate of 180 times per minute. This circuit is traced from terminal B at front contact *a* of the code transmitter 180CT, over front contact *a* of relay 10RAHR, back contact *c* of relay 6LTFPR, front contact *a* of relay 10LFSPR, reverse contact *b* of relay 10LFSR, front contact *b* of relay 10LASR, front contact *a* of relay 9TR, back contact *a* of relay 6LTR, and the winding of relay 6LCR to terminal N. Accordingly, the contacts of relay 6LCR will be recurrently picked up and released at the 180 code rate to periodically connect track battery 6LTB across the rails of section 6T at the right-hand end thereof. This coded energy flows westward over the rails of section 6T to the left-hand end. With contact *a* of relay 6RCR released, this energy is supplied to the winding of relay 6RTR, so that this relay operates its contacts recurrently at the 180 code rate. With contact *a* of relay 6RTR recurrently operating, energy is supplied to the windings of relays 6RTFPR and 6RTBPR, so that both of these relays pick up. Each of these relays, as well as other similar relays, is provided with slow release characteristics so that front contacts are held closed when the relay winding is supplied with coded energy.

With contact *a* of relay 4LTBPR released and contact *a* of relay 6RTBPR picked up, a circuit is established for supplying energy to the primary winding of decoding transformer DT, which circuit includes back contact *a* of relay 4LTBPR, front contact *a* of relay 6RTBPR, and either back contact *b* of relay 6RTR, back contact *b* of relay 4LTR, and the lower portion of the primary winding of transformer DT, or front contact *b* of relay 6RTR, when this relay is picked up, and the middle portion of the primary winding of transformer DT. As relay 6RTR, responding to the coded track energy, alternately closes its front and back contacts, current flows alternately in opposite directions through portions of the primary winding of transformer DT. The resulting alternating current energy induced in the secondary winding of transformer DT is rectified mechanically by the operation of contact *c* of relay 6RTR, so that pulses of direct current energy are supplied to the winding of relay 6—7HR, and its contacts will therefore pick up. At this time, since relay 6RTR is responding to 180 code, sufficient energy will also be supplied to the winding of relay 6—7DR through decoding unit 180DU from the full primary winding of transformer DT to cause the relay to pick up its contacts.

When front contact *a* of relay 6—7HR closes, a circuit is established for supplying energy to the winding of relay 6RSR, which may be traced from terminal B at front contact *a* of relay 6—7HR, over back contact *b* of relay 4LTFPR, front contact *b* of relay 6RTFPR, and the winding of relay 6RSR to terminal N. However, the pick up of relay 6RSR has no effect on the operation of the circuits at this particular time.

When front contact *b* of relay 6—7HR closes, a circuit is established for supplying energy at the 180 code rate to the winding of relay 4LCR. This circuit extends from terminal B at back contact *c* of relay 4LTFPR, over back contact *a* of relay 4LSR, contact *a* of code transmitter 180CT, front contact *b* of relay 6—7HR, back contact *d* of relay 4LTR, back contact *b* of relay 4LSR, and the winding of relay 4LCR to terminal N. Accordingly, contact *a* of relay 4LCR recurrently operates at 180 times per minute to connect track battery 4LTB across the rails of section 4T at the right-hand end thereof. This coded energy is supplied over the rails of section 4T to energize the winding of relay 4RTR, at the west end, to cause the contacts of this relay to operate at the 180 code rate. The code following operation of the contacts of relay 4RTR results in the closing of circuits similar to those described at signal location 6S—7S to thereby energize relays 4RTFPR, 4RTBPR, 4RSR, and 4—5HR. Additionally, since the energy supplied to decoding transformer DT at signal location 4S—5S is at the 180 code rate, sufficient energy will be supplied through decoding unit 180DU to cause the contacts of relay 4—5DR to pick up.

At signal location 6S—7S, energy is supplied at this time to the green lamp G of signal 6S by a circuit which includes front contact *e* of relay 6RTFPR, front contact *e* of relay 6—7HR, and front contact *b* of relay 6—7DR, so that signal 6S displays a clear aspect. Although contact *d* of relay 6—7HR is picked up at this time, energy is now supplied to the red lamp R of signal 7S over back contact *g* of relay 4LTFPR so that signal 7S continues to display a red or stop aspect. Energy is also supplied to the green lamp G of signal 4S by the circuit including front contact *e* of relay 4RTFPR, front contact *e* of relay 4—5HR, front contact *b* of relay 6NWPSR, and front contact *b* of relay 4—5DR, so that signal 4S displays a green or clear aspect. Signal 5S will continue to display a red or stop aspect, since back contact *d* of relay 2LTFPR is now closed to supply energy to the red lamp R of the signal.

Code transmitting relay 2LCR at signal location 4S—5S is now recurrently operated at the 180 code rate, being energized by a circuit which may be traced from terminal B at back contact *c* of relay 2LTFPR, over back contact *a* of relay 2LSR, contact *a* of code transmitter 180CT, front contact *b* of relay 4—5HR, back contact *d* of relay 2LTR, front contact *a* of relay 6NWPSR, back contact *b* of relay 2LSR, and the winding of relay 2LCR to terminal N. As a result of the recurrent operation of contact *a* of relay 2LCR, energy coded at the 180 code rate is supplied from track battery 2LTB to the rails of section 2T and flows westward over the rails of this section to energize the winding of relay 2RTR at the west end of the stretch, so that this relay operates its contacts at a corresponding rate.

The code following operation of contacts *b*, *c*, and *d* of track relay 2RTR causes the energization of relays 2RTFPR, 2RTBPR, 2RHR, and 2RDR, so that each of these relays will pick up its contacts. When contact *a* of relay 2RHR picks up, a circuit is established for energizing relay 2RHSPR, which may be traced from terminal B at reverse contact *d* of relay 2RFSR, over reverse contact *b* of relay 2RHSR, front contact *b* of relay 1TKSPR, front contact *a* of relay 2RHR, back contact *a* of relay 1RWCR, front contact *a* of relay 1NWCR, and the winding of relay 2RHSPR to terminal N. When back contact *b* of relay 2RHSPR opens, it interrupts the stick circuit for relay 2RASR which releases. The release of front contact *d* of relay 2RASR interrupts the circuit for energizing locking relay 1LR, with the result that its contacts *b* and *c* release to open the circuit for supplying energy to switch movement 1WM, so that the switch cannot be operated at this time. When back contact *a* of relay 1LR closes, a circuit is established for energizing signal control relay 2RAHR, which may be traced from terminal B at back contact *a* of relay 1LR, over back contact *c* of relay 2RASR, back contact *b* of relay 2TER, front contact *a* of relay 2RHSPR, front contact *c* of relay 1NWCR, and the winding of relay 2RAHR to terminal N. When front contact *a* of relay 2RAHR closes, it establishes a circuit for supplying energy to green lamp G of signal 2RA, this circuit including front contact *b* of relay 2RDR, so that signal 2RA now displays a clear or proceed aspect. The opening of back contact *b* of relay 2RAHR further interrupts the stick circuit for relay 2RASR while the closing of its front contact *c* energizes a circuit through terminal 19 of unit 1—2 for transmitting a clear signal indication to the control machine.

From the foregoing, it will be seen that, with the direction of traffic in the single track stretch established from west to east, the clearing of a signal for an eastbound train movement removes the track circuit steady energy supplied at the west end of the stretch. This removal causes coded track energy to be supplied at the east end of the stretch and to cascade through the various track sections to clear the corresponding signals, including the entering head block signal at the west end of the stretch.

During this reversal of energization of the track circuits in the stretch, a reversal of the circuits for supplying the approach indications on the control machine will take place, and it is necessary to prevent incorrect track occupancy indications on the machine due to this reversal. The manner in which the circuits operate to eliminate such false indications will now be described.

Considering first the wayside circuits, in the condition shown approach relay 2LAKR at the west end of the stretch is governed by the circuit which includes front contact *b* of relay 1TKSR, back contact *d* of relay 2RTFPR, line wire 61 to signal location 4S—5S, front contact *f* of relay 2LTFPR, and front contact *a* of relay 4RTPR. As a result, relay 2LAKR is initially energized. Relay 4RTPR at signal location 4S—5S is energized by energy supplied over wire 79 from signal location 6S—7S, where energy is supplied to the line circuit, and to the winding of relay 4LTPR, over front contact *f* of relay 4LTFPR. Relay 4LTPR at location 6S—7S is thus also picked up at this time. Front contact *a* of relay 4LTPR is included in a circuit for controlling approach relay 10RAKR, at the east end, which further includes front contact *d* of relay 6RTFPR, line wire 91 to the location at the east end of the stretch, back contact *d* of relay 6LTFPR, and front contact *b* of relay 9TKSR. A second control circuit for relay 10RAKR includes front contact *a* of relay 10LDR, front contact *d* of relay 6LTFPR, and front contact *b* of relay 9TKSR. However, in the condition shown relay 6LTFPR is picked up but relay 10LDR is released, so that relay 10RAKR is deenergized.

When the supply of steady energy is cut off at the west end of the stretch, relay 2LTFPR releases, as previously described, and its front contact *f* interrupts the circuit for supplying energy to the winding of relay 2LAKR, so that this relay releases. The closing of back contact *a* of relay 2LAKR completes a circuit to the office during a subsequent indication code, over terminals 21 of units 1—2 and front contact *g* of delivery relay 1—2D, to energize relay 2LAK. Upon completion of the indication cycle, relay 2LAK remains energized over the stick circuit including its own front contact *a* and back contact *g* of relay 1—2D. As the interruption of steady track energy cascades eastward through the stretch, the opening of front contact *f* of relay 4LTFPR interrupts the supply of energy to relays 4LTPR and 4RTPR, but the release of these relays has no effect on the circuits at this time. At the east end of the stretch, the release of relay 6LTFPR connects the circuit for energizing relay 10RAKR to line wire 91, but since relay 6RTFPR is still released at signal location 6S—7S, relay 10RAKR does not pick up at this time.

However, reviewing briefly, as coded energy is supplied over the rails from the east end of the stretch, relay 6RTFPR will pick up at signal location 6S—7S, relay 4RTFPR will pick up at signal location 4S—5S, and relays 2RTFPR and 2RDR will pick up at the west end of the stretch. Relay 4LTPR at location 6S—7S and relay 4RTPR at location 4S—5S will now be energized by a circuit which may be traced from terminal B over front contact *d* of relay 4RTFPR through the winding of relay 4RTPR to terminal N, and also through line wire 79 and the winding of relay 4LTPR to terminal N at signal location 6S—7S. Front contact *a* of relay 4LTPR now establishes a circuit including this contact, front contact *d* of relay 6RTFPR, line wire 91, back contact *d* of relay 6LTFPR, and front contact *b* of relay 9TKSR to energize relay 10RAKR at the east end of the stretch. When relay 10RAKR picks up, its back contact *a* opens to transmit, through terminals 21 of units 9—10, an indication code to the control machine which releases indication relay 10RAK in the machine. At the west end of the stretch, with relays 2RDR and 2RTFPR picked up, energy is supplied to relay 2LAKR over front contact *a* of relay 2RDR, front contact *d* of relay 2RTFPR, and front contact *b* of relay 1TKSR, so that relay 2LAKR again picks up, causing indication relay 2LAK in the control machine to release.

From the foregoing, it will be seen that the cutting off of steady energy in the single track stretch and the subsequent supply of coded energy through the stretch from the east end to the west end thereof will cause, at the control office, relay 2LAK to pick up and again release, while relay 10RAK releases during the operation. Additionally, relay 10LBKR, at the east end of the stretch, the purpose of which is to check the presence of steady energy at that end of the stretch, releases when the steady energy is cut off at that point, since front contact *b* of relay 6LTFPR will interrupt the circuit for energizing relay 10LBKR. This results in an indication code being transmitted to the control machine, through terminals 23 of units 9—10, which results in the release of relay 10LBK in the machine.

At the office, with relay 10LBK released, and during the time interval between the pick up and release of relay 2LAK, a flash block occupied indication would incorrectly occur in indication lamps 2LAKE and 10RAKR prior to the release of relay 10LAK, except for the provision of relay BKLO in the control machine, the purpose of which is to prevent such a flash indication. Turning now to a discussion of the control of this relay and the manner in which it prevents a flash indication, relay BKLO is energized when signal 2RA is to be cleared. The pick up of relay 2RGS to send a control for clearing the signal establishes a circuit which extends from terminal B at front contact *c* of relay 10LBK, which is closed during the time that steady energy is still being received at the east end of the stretch, over front contact *d* of relay 2RGS, and the winding of relay BKLO to terminal N. With relay BKLO picked up, neither indication lamp 2LAKE or 10RAKE can be lighted, since back contact *c* of relay BKLO interrupts the circuits for supplying energy to both of these lamps. This circuit arrangement extends from terminal B over back contacts *b* of relays 10LBK and 2RBK, back contact *c* of relay BKLO, and thence, front contact *b* of relay 2LAK and lamp 2LAKE in multiple with front contact *b* of relay 10RAK and lamp 10RAKE, to terminal N.

When relay 10LBK releases due to the absence of steady energy at the eastern end of the stretch, a stick circuit is established for relay BKLO which includes back contact *c* of relay 10LBK, back contact *d* of relay 2RBK, back contact *c* of relay 1TK, back contact *c* of relay 9TK, front contacts *c*, in multiple, of relays 2LAK and 10RAK, and front contact *a* of relay BKLO. Relay BKLO is sufficiently slow in releasing its contacts so that it bridges the interval during the time between the opening of its pick up circuit previously traced and the establishment of its stick circuit. As a result, relay BKLO will not release when relay 10LBK releases. When relay 10RAK eventually releases, its front contact *c* in the stick circuit of relay BKLO will open, but this circuit will then be maintained over front contact *c* of relay 2LAK. However, when the reversal of track energization is finally completed, relays 2LAK and 10RAK in the machine are both deenergized, so that their front contacts *c* will interrupt the stick circuit for relay BKLO. Since front contact *c* of relay 10LBK is open prior to this time, there is neither a pickup or stick circuit for relay BKLO established and it releases. Thereafter, during any time that relay 2LAK or 10RAK is picked up a lighting circuit will be established for lamp 2LAKE or 10RAKE, respectively.

Also at the control machine, at this time, indication relay 2RHK is energized by energy supplied from terminal 19, as a result of the closing of front contact *c* of signal control relay 2RAHR at the field location. Relay 2RHK thus picks up and establishes a stick circuit for itself including its own front contact *a* and a back contact *e* of delivery relay 1—2D. When contact *b* of relay 2RHK picks up, it interrupts the supply of energy to indication lamp 2NKE and supplies energy to indication lamp 2RHKE, thereby indicating to the operator that the signal at the west end of the stretch has cleared. Additionally, when the indication code is supplied to the machine to energize relay 2RHK, an additional circuit is established from terminal 19 of the office coding unit over front contact *f* of delivery relay 1—2D, to hold relay 2RGS energized over its front contact *a* and thus check that relay 2RGS should remain energized to correspond to the field condition. When contact *f* of relay 1—2D releases, the usual stick circuit including back contact *f* of relay 1—2D recloses so that relay 2RGS is maintained picked up.

It will now be assumed that the eastbound train for which signal 2RA has been cleared proceeds past this signal and enters the stretch of single track extending between the head blocks. When the train enters section 1T, relay 1TR releases and its front contact *c* interrupts the circuit for supplying energy to the winding of relay 1TKSR. Relay 1TKSR accordingly releases and its front contact *c* interrupts the supply of energy to the winding of relay 1TKSPR which also releases at this time. When back contact *a* of relay 1TKSR closes, it establishes a circuit for supplying energy to the lower winding of relay 2RHSR, to thereby restore the contacts of relay 2RHSR to their normal position. The circuit for relay 2RHSPR is interrupted at this time at front contact *b* of relay 1TKSPR as well as at reverse contact *b* of relay 2RHSR. When front contact *a* of relay 2RHSPR releases, it cuts off the supply of energy to the winding of relay 2RAHR and the contacts of this relay release, back contact *a* establishing the circuit for supplying energy to the red lamp R of signal 2RA. At this time, a circuit is established for reenergizing relay 2RASR, which is traced from terminal B at back contact *a* of relay 2RBHR, over back contact *b* of relay 2RAHR, back contact *b* of relay 2RHSPR, back contact *b* of relay 1TR, and the winding of relay 2RASR to terminal N. The closing of front contact *a* of relay 2RASR reestablishes the stick circuit for this relay. Back contact *c* of relay 2RASR further interrupts the circuit for energizing relay 2RAHR. Front contact *d* of relay 2RASR closes in the circuit for supplying energy to the locking relay 1LR, but this circuit remains open at front contact *c* of relay 1TKSPR, so that switch movement 1WM cannot be operated with a train occupying the detector section.

The closing of back contact *c* of relay 1TKSR supplies energy to terminal 25 of field unit 1—2 so that an indication code is transmitted to the control machine which results in energiztaion of track indication relay 1TK. This relay remains picked up as a result of a stick circuit established over its own front contact *a* and back contact *a* of the delivery relay at the end of the code. Additionally, the removal of potential from terminal 19 of the field unit 1—2 as a result of the release of front contact *c* of relay 2RAHR causes signal indication relay 2RHK at the office to release.

When back contact *e* of relay 1TK in the control machine opens, it interrupts the stick circuit for supplying energy to the windings of relays 2RG and 2RGS, and as a result these relays release. Front contact *b* of relay 1TK establishes an obvious circuit for lighting track indication lamp 1TKE, while the release of contact *b* of relay 2RHK extinguishes indication lamp 2RHKE and lights indication lamp 2NKE, so that the operator is advised of the entrance of the train into the detector section and the restoration of signal 2RA to display its stop aspect. At the field location at the west end of the stretch, the opening of front contact *b* of relay 1TKSR interrupts the supply of energy to the winding of relay 2LAKR, so that its back contact *a* closes to cause an indication code to be transmitted to the control machine which results in the pickup of relay 2LAK. With relay 2LAK picked up, energy is supplied to the approach indication lamp 2LAKE, over the circuit including back contact *b* of relay 10LBK, back contact *b* of relay 2RBK, back contact *c* of relay BKLO, and front contact *b* of relay 2LAK.

When the east bound train enters section 2T, the wheels and axles of the train shunt the supply of coded energy from the winding of relay 2RTR, so that this relay releases its contacts and they remain released. This action results in the subsequent release of relays 2RTFPR, 2RTBPR, 2RHR and 2RDR, but the circuits governed by these relays which are of consequence at this time have already been interrupted by the entrance of the train into track section 1T, so that other than the further interruption of these circuits, no other action takes place as a result of the release of the mentioned relays.

When the rear of the eastbound train vacates section 1T, relay 1TR will be reenergized and its contacts will pick up. Assuming that no indication code has been stored for starting from the field unit 1—2, the indication code starting relay 1ST will have its contacts in the normal position and a circuit is established thereby from terminal B at an internal connection of the field unit 1—2, over terminal 27 of the field unit, normal contact *a* of relay 1ST, front contact *c* of relay 1TR, and the winding of relay 1TKSR to terminal N. When relay 1TKSR picks up, its front contact *a* establishes a stick circuit for itself which may be traced from terminal B at front contact *a* of relay 1TKSR, over front contact *c* of relay 1TR and the winding of the relay to terminal N. Thus relay 1TKSR will remain picked up during any subsequent indication codes transmitted from field unit 1—2, until the next time that a train occupies section 1T. When front contact *c* of relay 1TKSR closes, it reenergises relay 1TKSPR which picks up. Closing of front contact *c* of relay 1TKSPR causes the reenergization of locking relay 1LR, so that its front contacts *b* and *c* in the circuit for controlling switch movement 1WM are closed, as well as front contacts *d* and *e* in the control circuit for relay 1WSR. Thus with the detector section unoccupied, a control code could be sent at this time to operate switch 1W.

When back contact *c* of relay 1TKSR opens, an indication code is transmitted to the control machine to release track indication relay 1TK. The release of front contact *b* of relay 1TK interrupts the supply of energy to track indication lamp 1TKE, so that the operator is advised that the eastbound train has vacated the detector section at the west end of the stretch. The closing of back contact *e* of relay 1TK reestablishes the connection to terminal N for the relays 2RG and 2RGS in the control machine, so that, if desired, the operator may position signal lever 2GLO to the right to cause the transmission of a control code for reclearing signal 2RA. However, signal 2RA could not clear at this time, since the train is occupying track section 2T and relay 2RHR at the field location is released, its front contact *a* interrupting the circuit for energizing relay 2RHSPR which in turn controls the signal control relays.

At the field location at the west end of the single track stretch, code transmitting relay 2RCR is now steadily energized by the circuit originally traced, since front contact *a* of relay 1TR is now closed. Accordingly, unless signal 2RA is to be recleared, steady energy will be supplied to the rails of section 2T at the west end of the stretch behind the eastbound train. Even though front contact *b* of relay 1TKSR at the west end of the stretch is now closed, the circuit for energizing relay 2LAKR, transferred over back contact *d* of relay 2RTFPR to line wire 61, remains open at front contact *f* of relay 2LTFPR at signal location 4S—5S. Relay 2LAKR thus remains released and track occupancy lamp 2LAKE in the control machine remains lighted to indicate the presence of a train in the western portion of the single track stretch.

When the eastbound train passes signal location 4S—5S, the supply of coded energy to the winding of relay 4RTR is cut off, and the contacts of this relay release and remain released. Accord'ngly, relays 4—5HR, 4—5DR, 4RTFPR, and 4RTBPR will all release. The opening of front contact *a* of relay 4—5HR interrupts the circuit previously traced for supplying energy to the winding of relay 4RSR, but this relay remains energized by a stick circuit including back contact *c* of relay 4RTFPR and front contact *a* of relay 4RSR. The sequence of release of the relays and the slow release time of relay 4RSR are selected so that the contacts of relay 4RSR do not release during the interval between the time of release of relay 4—5HR and the closing of back contact *c* of relay 4RTFPR. With contact *e* of relay 4RTFPR released, energy is supplied to red lamp R of signal 4S, so that this signal displays a red or stop aspect behind the eastbound train.

When relay 4RTFPR releases, its front contact *d* interrupts the circuit for supplying energy to the winding of relay 4RTPR, and additionally interrupts the supply of energy over line wire 79 to deenergize relay 4LTPR at signal location 6S—7S. When relay 4LTPR at signal location 6S—7S releases, its front contact *a* interrupts the circuit including wire 91 for energizing relay 10RAKR at the right-hand or east end of the stretch. Back contact *a* of this latter relay thus closes to cause an indication code to be transmitted from the east end of the stretch which results in the pickup of relay 10RAK at the control machine. The closing of front contact *b* of relay 10RAK results in energy being supplied to indication lamp 10RAKE, so that, at this time, both block indication lamps 2LAKE and 10RAKE are lighted to indicate to the control operator that the train has entered the middle section, namely, section 4T, of the single track stretch.

When the rear of the eastbound train vacates section 2T, the steady energy supplied to the rails of section 2T at the west end thereof will be supplied to the winding of relay 2LTR, which picks up and holds its front contacts closed. As a result, front contact repeater relay 2LTFPR also picks up. During the period that the train occupies both sections 2T and 4T, a circuit is prepared for energizing code transmitting relay 2LCR. This circuit may be traced from terminal B over back contact *c* of relay 2LTFPR, back contact *a* of relay 2LSR, contact *a* of code transmitter 75CT, front contact *b* of relay 4RSR, back contact *b* of relay 4—5HR, back contact *d* of relay 2LTR, front contact *a* of relay 6NWPSR, back contact *b* of relay 2LSR, and the winding of relay 2LCR to terminal N. However, when section 2T is vacated, the circuit thus traced is interrupted at two points, namely, back contact *c* of relay 2LTFPR and back contact *d* of relay 2LTR. It is to be seen that, if signal control relay TRHSR at the west end of the stretch is operated to its reverse position by the transmission of a control code for reclearing one of the entering signals, the steady energy supplied to the west end of section 2T will be cut off. Accordingly, relays 2LTR and 2LTFPR at the east end of section 2T will then remain released. With these relays released, the circuit traced above is established to cause a supply of coded energy at the 75 code rate to be transmitted over the rails of section 2T to the west end of the stretch. The code following operation of track relay 2RTR at the 75 code rate will cause relay 2RHR to be energized, although relay 2RDR will remain deenergized. Under these conditions, the entering signals for the stretch can be cleared but will display only a yellow aspect, indicating that the next signal is at stop. It will thus be seen that the arrangement as shown provides for following moves into the single track stretch.

When the eastbound train moves past signal 6S, and enters section 6T, track relay 6RTR is shunted and its contacts remain released. In a manner similar to that described for the action which takes place when the train passes signal 4S and enters section 4T, relays 6RTFPR, 6RTBPR, 6—7HR, and 6—7DR all release, but stick relay 6RSR remains picked up over the stick circuit including back contact *c* of relay 6RTFPR and front contact *a* of relay 6RSR. The release of contact *e* of relay 6RTFPR interrupts the circuit for supplying energy to green lamp G of signal 6S and reestablishes the supply of energy to red lamp R so that signal 6S displays a red or stop aspect behind the train. The release of front contact *d* of relay 6RTFPR further interrupts the circuit for supplying energy to the winding of relay 10RAKR at the right-hand end of the stretch, so that this relay remains released and as a result the indication lamp 10RAKE at the control machine remains lighted.

It will now be assumed that the rear of the eastbound train vacates section 4T, so that the train is wholly contained within section 6T. At this time, a circuit is established for supplying energy coded a the 75 code rate to code transmitting relay 4LCR. This circuit extends from terminal B at back contact *c* of relay 4LTFPR, over back contact *a* of relay 4LSR, contact *a* of code transmitter 75CT, front contact *b* of relay 6RSR, back contact *b* of relay 6—7HR, back contact *d* of relay 4LTR, back contact *b* of relay 4LSR, and the winding of relay 4LCR to terminal N. Accordingly, because of the code following operation of relay 4LCR and its contact *a*, impulses of energy coded at the 75 code rate will be supplied from track battery 4LTB to the rails of section 4T and these impulses operate relay 4RTR at the west end of section 4T at a corresponding rate.

When relay 4RTFPR at signal location 4S—5S picks up, as a result of the code following operation of relay 4RTR, its back contact *c* interrupts the stick circuit for relay 4RSR. Since relays 4RTFPR and 2LTFPR are both picked up at this time, the circuit for energizing relay 4RSR over front contact *a* of front 4—5HR is open, so that relay 4RSR shortly releases its contacts. A circuit is thus prepared for energizing relay 4RCR with steady energy, which circuit is closed the next time relay 4RTR releases during an off period of the 75 track code being supplied to its winding. That is, when back contact *d* of relay 4RTR closes, energy is supplied to the winding of relay 4RCR by a circuit traced from terminal B at front contact *c* of relay 2LTFPR, over back contact *c* of relay 2LSR, back contact *c* of relay 4—5HR, back contact *d* of relay 4RTR, back contact *c* of relay 4RSR, front contact *h* of relay 6NWPSR, front contact *c* of relay 6NWPR, and the winding of relay 4RCR to terminal N. It is to be noted that, even though front contact *a* of relay 4RTBPR closes, the code following operation of contact *b* of relay 4RTR cannot, with front contact *b* of relay 2LTR remaining closed, cause the energization of relay 4—5HR through transformer DT in the usual manner. Thus relay 4—5HR remains released and its back contact *c* will not interrupt the circuit just traced for relay 4RCR. When contact *a* of relay 4RCR picks up, it disconnects the winding of relay 4RTR from the rails of section 4T so that back contact *d* of relay 4RTR remains closed to continue the steady energization of relay 4RCR. The steady energy supplied from track battery 4RTB over front contact *a* of relay 4RCR feeds over the section rails to the east end of section 4T, during the intervals between the supply of coded energy from battery 4LTB. In the next "off" interval, when relay 4LCR is released, the winding of relay 4LTR is connected across the rails of section 4T and thus energized by the steady energy supplied from the west end of section 4T. When back contact *d* of relay 4LTR opens, it interrupts the circuit for relay 4LCR, so that contact *a* of this latter relay remains released to continuously connect the winding of relay 4LTR across the rails of section 4T. Relay 4LTFPR will also pick up, when relay 4LTR closes its front contacts, to thus further interrupt the circuit governing code transmitting relay 4LCR.

It is apparent that if the control operator causes the transmission of a control code to clear an entering signal at the west end of the stretch, the steady energy supplied to the rails at the west end of section 2T will be cut off, which will result in the steady energy supplied to the rails at the west end of section 4T being cut off. This results in the release of relays 4LTR and 4LTFPR at the east end of section 4T. With these relays released, the circuit previously traced for energizing the winding of relay 4LCR over contact *a* of code transmitter 75CT will be reestablished so that energy coded at the 75 code rate will be transmitted over section 4T to clear signal 4S. This causes energy coded at the 180 rate to be transmitted from the east end of section 2T, since relay 2LCR is controlled over front contact *b* of relay 4—5HR and contact *a* of transmitter 180CT. The code following operation of relay 2RTR at the west end of the stretch results in the clearing of the entering signal. Since the code pulses in section 2T are at the 180 code rate, relay 2RDR will be energized at the west end of the stretch so that signal 2RA or 2RB, whichever happens to be cleared, will display a green or clear aspect. It can thus be seen that as the train progresses through the stretch, steady energy is supplied behind the train, in such manner that if the steady energy is cut off at the entering end of the stretch, the signals will reclear appropriately behind the train to permit following moves into the stretch.

At this time, with the train wholly contained within section 6T, and with steady energy being supplied at the west end of section 2T and also at the west end of section 4T, relay 4LTFPR is picked up at signal location 6S—7S. Front contact *f* of this relay establishes a circuit, including line wire 79, for energizing relays 4LTPR and 4RTPR. The circuit for energizing relay 10RAKR at the east end of the stretch over line wire 91 is still interrupted at front contact *d* of relay 6RTFPR, so that relay 10RAK in the control machine remains picked up to maintain the indication lamp 10RAKE lighted. When relay 4RTPR at signal location 4S—5S picks up, a circuit is established for energizing relay 2LAKR at the west end of the stretch. This circuit extends from terminal B at front contact *a* of relay 4RTPR, over front contact *f* of relay 2LTFPR, line wire 61, back contact *d* of relay 2RTFPR, front contact *b* of relay 1TKSR, and the winding of relay 2LAKR to terminal N. Accordingly, relay 2LAK in the control machine will be released and the opening of front contact *b* of this relay interrupts the supply of energy to lamp 2LAKE. The operator is thereby notified that the train has progressed through the left-hand and middle sections of the single track stretch and now occupies only the right-hand portion of the single track stretch.

When the eastbound train passes signal 10RA, track relay 9TR will be shunted and its contacts will release. Front contact *a* of relay 9TR interrupts the circuit for energizing relay 6LCR, which accordingly ceases operation. Front contact *c* of relay 9TR interrupts the circuit for energizing relay 9TKSR, and this relay releases followed by the subsequent release of relay 9TKSPR. This deenergizes relay 10RAHR which is controlled, in a manner not shown, so as to be responsive to the occupancy of section 9T. The closing of back contact *c* of relay 9TKSR causes the transmission of an indication code to the control machine, where track indication relay 9TK picks up to thereby cause track indication lamp 9TKE to be lighted to indicate to the operator that the train has occupied section 9T. By means not shown, the stop indications of signals 10RA and 10RB may be displayed in a manner similar to that previously described for signal 2RA to indicate to the control operator that this signal has also been placed at stop.

When the rear of the eastbound train vacates section 6T, no action will take place until the rear of the train has also passed out of detector section 9T, at which time track relay 9TR will again pick up. With front contact *a* of relay 9TR closed, the circuit for energizing relay 6LCR is again complete. However, with relay 10RAHR released, relay 6LCR is controlled by contact *a* of transmitter 75CT and operates its contacts at the 75 code rate, thus transmitting energy coded at the 75 code rate westward over the rails of section 6T. When the first impulse of coded energy is supplied to the winding of relay 6RTR, the contacts of this relay will pick up. Front contact *a* of relay 6RTR energizes relay 6RTFPR which picks up immediately. As pointed out previously in connection with the train movement out of section 4T, this action results in the release shortly of directional stick relay 6RSR. Thus a circuit is prepared for energizing relay 6RCR by steady energy and completed when back contact *d* of relay 6RTR closes during the next "off" interval of the 75 code energy supplied to its winding. The steady energy transmitted eastward over the rails of section 6T will cause relay 6LTA to pick up during the next interval that contact *a* of relay 6LCR is released. When back contact *a* of relay 6LTR opens, it interrupts the circuit for relay 6LCR, so that relay 6LTR remains connected across the rails. Front contact *b* of relay 6LTR establishes a circuit for energizing relay 6LTFPR, but the control circuit for relay 6LTBPR remains open at back contact *b* of relay 6LTR. Additionally, if no indication code is being transmitted from field unit 9—10 at the time the train vacates section 9T, the closing of front contact *c* of relay 9TR will reestablish a supply of energy to the winding of relay 9TKSR and its contacts will pick up, front contact *c* of this latter relay establishing the energizing circuit for relay 9TKSPR which also picks up. The opening of back contact *c* of relay 9TKSR results in the transmission of an indication code to the office to release track indication relay 9TK, to thereby extinguish track indication lamp 9TKE, indicating to the operator that the train has passed out of detector section 9T.

The presence of steady energy at the east end of the stretch is indicated by the energization of relay 10LBKR over the circuit traced from terminal B over back contact *a* of relay 6LTBPR, front contact *b* of relay 6LTFPR, reverse contact *a* of relay 10LFSR, front contact *a* of relay 9TKSPR, and the winding of relay 10LBKR to terminal N. When front contact *a* of relay 10LBKR closes, an indication is transmitted to the control machine which causes relay 10LBK in the control machine to pick up. At the control point, the opening of back contact *b* of relay 10LBK interrupts the circuits for supplying energy to lamps 2LAKE and 10RAKE. Thus, even though relay 10RAK remains picked up, the circuit for supplying energy to the lamp 10RAKE is interrupted with the result that an indication is displayed that the eastern portion of the single track stretch has become vacant.

The apparatus is now restored to the condition shown in the drawings, in which the single track stretch is unoccupied, traffic direction is set up for eastward train movements, steady energy is supplied through the various track sections in the single track stretch from the west end thereof to the east end thereof, and the indications are restored to the condition shown on the control machine.

It will now be assumed that the operator desires to clear a signal at the east end of the stretch for a westward train movement. Accordingly, signal lever 10GLO is moved to its left-hand position and starting button 9—10STB is actuated to initiate a control code to reverse the direction of traffic in the single track stretch and to clear the entering signal, in this case signal 10LA, since switch 9 is assumed to remain in its normal position. A number of actions take place in the circuitry associated with the control machine, and this operation will be described before turning to the description of the apparatus in the field.

With signal lever 10GLO in its left-hand position, and signal lever 2GLO in its normal position, a circuit is established for energizing relay FS to reverse the contacts of polar traffic relay 2—10F. This circuit may be traced from terminal B at back contact *d* of relay 9TK, over back contact *e* of relay 10LGS, back contact *d* of relay 6WLSK, back contact *b* of relay 6WLP, back contact *e* of relay 2RGS, back contact *d* of relay 1TK, front contact *e* of relay 10LBK, contact *a* of lever 2GLO closed in the normal or left position, contact *b* of lever 10GLO closed in the left position, reverse contact *b* of relay 2—10F, and back contact *d* and the winding of relay FS to terminal N. Accordingly, relay FS will pick up and its contact *d*, which is of the make-before-break or continuity transfer type, completes a stick circuit for relay FS over the front contact which is established before the pickup circuit is interrupted at the associated back contact. The stick circuit for relay FS connects the winding of this relay to terminal B through back contact *b* of relay 1—2ST, back contact *b* of relay 9—10ST, and back contact *b* of relay BKLO, all connected in multiple. When the contacts of relay FS pick up, a circuit including the circuit previously described for energizing relay FS up to and including contact *b* of lever 10GLO and additionally including front contact *b* of relay 9—10STBP and front contact *c* of relay FS is closed to the upper winding of relay 2—10F, and through the winding to terminal N. The energization of this winding causes the contacts of the polar stick relay 2—10F to move to their left-hand or normal position.

When lever 10GLO is positioned to the left and push button 9—10STB is actuated, contact *a* of lever 10GLO, which is closed only in the left position, establishes a circuit for energizing relay 10LG, which circuit may be traced from terminal B at contact *a* of lever 10GLO, over front contact *c* of relay 9—10STBP, which is picked up when the push button 9—10STB is operated, the winding of relay 10LG, and back contact *e* of relay 9TK to terminal N. When relay 10LG picks up, its front contact *a* establishes an initial stick circuit for the relay which further includes contact *a* of lever 10GLO. When relay 9—10STBP releases, an additional stick circuit is established for relay 10LG over back contact *c* of relay 9—10STBP, so that thereafter inadvertent operation of lever 10GLO will not cause the release of relay 10LG to incorrectly transmit a control code to place signal 10L at stop. When relay 10LG picks up, a circuit is established for energizing relay 10LGS, which extends from terminal B at front contact *a* of relay MP, which relay is picked up when a control code is to be transmitted from either of the office control units to the field locations, over back contact *d* of relay 6WLRK, back contact *g* of relay 6WLP, normal contact $c$ of relay 2—10F, front contact $e$ of relay 9—10S, which relay is picked up when the control code has selected station 9—10 for the transmission of control functions, front contact $b$ of relay 10LG, the winding of relay 10LGS, and back contact $e$ of relay 9TK to terminal N. When front contact $a$ of relay 10LGS closes, it establishes a stick circuit including back contact $f$ of relay 9—10D to maintain relay 10LGS energized.

When contact $a$ of relay 2—10F moves to its normal position, the eastward triffic indication lamp RFKE is extinguished, and the westward traffic indication lamp LFKE is lighted to indicate that the direction of traffic is being set up in the westward direction in the single track stretch. When push button 9—10STB is operated and relay 9—10STBP picks up as a result, a circuit is established over front contact $a$ of relay 9—10STBP for energizing relay 9—10ST to start the transmission of a control code to field unit 9—10. Additionally, a circuit is established for supplying energy to the winding of relay 1—2ST for initiating the transmission of a control code to field unit 1—2, the latter circuit being traced from terminal B at front contact $d$ of relay 9—10STBP, over front contact $f$ of relay FS, and the winding of relay 1—2ST to terminal N. As hereinbefore described, these start relays pick up and remain held up until such time as the station selection portion of the appropriate control code has been sent to the respective field locations, at which time the relays are released.

It will be seen from the foregoing that at this time, with signal lever 10GLO operated to its left position and push button 9—10STB having been actuated, the machine circuits have acted to cause the transmission of control codes to both field units 1—2 and 9—10 at opposite ends of the single track stretch. The character of these control codes will now be explained as to the manner in which they enter into the reversal of traffic movement in the stretch. With the office starting relays for both field stations and traffic stick relay FS picked up, a circuit is established for energizing relay BKLO, which is traced from terminal B at front contact $c$ of relay 1—2ST, over front contact $c$ of relay 9—10ST, front contact $a$ of relay FS, and the winding of relay BKLO to terminal N. Accordingly, relay BKLO will pick up. As a result, back contact $d$ of relay BKLO and back contact $e$ of relay FS are both open in the negatvie return from the windings of relays 2RBK and 10LBK, so that relay 10LBK releases. With relays 10LBK and 2RBK both released, a stick circuit is established for relay BKLO which includes back contact $c$ of relay 10LBK, back contact $d$ of relay 2RBK, back contact $c$ of relay 1TK, back contact $c$ of relay 9TK, front contact $c$ of relay 10RAK, and front contact $a$ of relay BKLO. Front contacts $e$ and $c$ of relays 10LBK and 2RBK, respectively, in the circuits for controlling the upper and lower windings, respectively, of traffic relay 2—10F are open to prevent any operation of the traffic relay at this time. Additionally, relay BKLO is maintained energized to prevent the possibility of flash indication on track lamps 2LAKE and 10RAKE while traffic is being reversed in the field. All three paths of the stick circuit network for relay RS are now open and this relay releases. However, the closing of back contact $e$ of relay FS does not now complete any circuit for either relay 10LBK or relay 2RBK which remain released.

The circuits in the control machine governed by traffic relay 2—10F, which transmit control codes to each of the field locations at opposite ends of the single track stretch, are arranged in such manner that the traffic relays such as relay 10LFSR at the right-hand end of the stretch and relay 2RFSR at the left-hand end of the stretch operate their contacts to positions which are in accordance with the position of the contacts of the traffice relay in the machine. As here shown, the circuits are arranged so that, when contacts $d$ and $e$ of relay 2—10F in the control machine are positioned to the right, energy is supplied to terminals 39 and 37 of the office coding unit 9—10 and through the code communication system to energize terminals 39 and 37 at the field unit 9—10 with a corresponding polarity to cause traffic relay 10LFSR to position its contacts to the right. When contacts $d$ and $e$ of relay 2—10F in the control machine are operated to their left-hand position, relay 10LFSR will position its contacts to their left-hand position, by means not shown, but which may be arranged similar to those shown in the drawings for positioning the contacts to their right-hand position, or through the medium of the code communication system in the manner illustrated in the aforementioned Manual 506A. In similar fashion, when contacts $d$ and $e$ of relay 2—10F are operated to their left-hand position, a circuit is established for energizing relay 2RFSR at the west end of the stretch to position its contacts to their left-hand position, but when contacts $d$ and $e$ of relay 2—10F in the control machine occupy their right-hand position, the contacts of relay 2RFSR at the west end of the stretch are operated, by means not shown, to their right-hand position. At this time, therefore, when station selection relays 9—10S and 1—2S pick up during the control codes transmitted as a result of the starting action previously described, the traffic relays at the field locations will operate their contacts to positions opposite to that in which they are shown.

When contact $a$ of relay 10LFSR moves to its left-hand position, it interrupts the circuit for energizing relay 10LBKR, so that as a result relay 10LBK in the control machine will continue to remain released, this relay having previously been released by the pick up of relays FS and BKLO. With reverse contact $b$ of relay 10LFSR open, the circuit previously employed for supplying coded energy to the winding of relay 6LCR is interrupted further at this point, so that relay 6LCR cannot be energized to supply coded energy to section 6T at this time even if the remainder of the circuit should be closed.

At the west end of the stretch, which is now the selected exit end for westward train movements, normal contact $a$ of relay 2RFSR is now closed in the circuit for supplying energy to the winding of relay 2RBKR, which circuit further includes front contact $a$ of relay 1TKSPR, front contact $b$ of relay 2RTFPR, and back contact $a$ of relay 2RTBPR. However, the circuit for relay 2RBKR remains open at front contact $b$ of relay 2RTFPR. When contact $b$ of relay 2RFSR moves to its left-hand position, the supply of steady energy to the winding of code transmitting relay 2RCR is cut off. In its stead, energy coded over contacts of code transmitter 180CT or 75CT is supplied to the winding of the transmitting relay in accordance with the aspect displayed by signal 2LA. Assuming that signal 2LA has been cleared for the westward train movement, the circuit for energizing relay 2RCR at this time may be traced from terminal B over contact $a$ of code transmitter 180CT, front contact $a$ of relay 2LAHR, back contact $c$ of relay 2RTFPR, front contact $a$ of relay 2RFSPR, normal contact $b$ of relay 2RFSR, front contact $b$ of relay 2RASR, front contact $a$ of relay 1TR, back contact $a$ of relay 2RTR, and the winding of relay 2RCR to terminal N. Accordingly, the contacts of relay 2RCR will operate at the 180 code rate to thereby supply impulses of coded energy eastward over the rails of section 2T from the left-hand or west end thereof.

At intermediate location 4S—5S, the reception of impulses of coded energy at the 180 code rate by relay 2LTR will cause the contacts of this relay to operate at a corresponding rate. Accordingly, relay 2LTBPR will now also be picked up and energy is supplied to decoding transformer DT so that relay 4—5HR picks up. The circuit for the primary winding of transformer DT includes front contact $a$ of relay 2LTBPR, back contact $a$ of relay 4RTBPR, back contact $b$ of relay 4RTR, and front and back contact $b$, alternately, of relay 2LTR. Additionally, since the energy supplied to the primary winding of decoding transformer DT is at the 180 code rate, sufficient energy will pass through unit 180DU to clear control relay 4—5DR so that it also picks up. Relay 2LSR will be energized at this time by the circuit traced from terminal B at front contact $a$ of relay 4—5HR, over back contact $b$ of relay 4RTFPR, front contact $b$ of relay 2LTFPR, and the winding of relay 2LSR to terminal N. At this time, with relays 2LTFPR, 4—5HR, and 4—5DR picked up, an obvious circuit is established for supplying energy to the green lamp G of signal 5S so that this signal displays a green or proceed aspect.

Relay 4RCR is energized at this time by a circuit including back contact $c$ of relay 4RTFPR, back contact $a$ of relay 4RSR, contact $b$ of code transmitter 180CT, front contact $c$ of relay 4—5HR, back contact $d$ of relay 4RTR, back contact $c$ of relay 4RSR, front contact $h$ of relay 6NWPSR, and front contact $c$ of relay 6NWPR. Accordingly, coded energy at the 180 code rate is supplied to the rails of section 4T at the west end thereof and flows eastward over the rails to cause the code following operation of track relay 4LTR at the east end of section 4T. In a manner similar to that described in connection with signal location 4S—5S, the code following operation of relay 4LTR will cause relays 4LTFPR, 4LTBPR, 4LSR, 6—7HR, and 6—7DR to be energized, with the result that signal 7S displays a green or clear aspect. Code transmitting relay 6RCR is energized by energy coded at the 180 code rate to cause the transmission of coded impulses at the same rate over the rails of section 6T to the eastern end of the single track stretch. Relay 6LTR at the east end of the single track stretch operates its contacts at the rate of 180 operations per minute in response to the energy supplied to the winding of the relay over the rails of section 6T. This operation results in the energization of relays 6LTFPR, 6LTBPR, 10LHR, and 10LDR.

With coded energy being received at the right-hand or eastern end of the section, conditions are now such that entering signal 10LA or 10LB may be cleared depending upon the position of track switch 9W, in this case assumed to be normal. At the control office, with the contacts of relay 2—10F operated to their left-hand position and signal lever 10GLO in its left-hand position, the relays 10LG and 10LGS were picked up as previously described. When the control code for positioning the traffic relays in the field was transmitted, additional code steps were provided for reversing signal control relay 10LHSR at the eastern end of the stretch, these circuits being substantially similar to those previously described for relay 2RHSR, and therefore their detailed description is deemed unnecessary.

With the contacts of relay 10LHSR in their reverse position, circuits are now established for clearing signal 10LA, through the energization of signal control relay 10LAHR. First, relay 10LHSPR is energized by a circuit including normal contact $d$ of relay 10LFSR, reverse contact $b$ of relay 10LHSR, front contact $b$ of relay 9TKSPR, front contact $a$ of relay 10LHR, back contact $a$ of relay 9RWCR, front contact $a$ of relay 9NWCR, and the winding of relay 10LHSPR. When relay 10LHSPR picks up, its back contact $b$ interrupts the stick circuit for signal locking relay 10LASR, with the result that the contacts of this relay release. The opening of front contact $d$ of relay 10LASR causes the release of locking relay 9LR, so that switch 9W cannot now be operated. With back contact $a$ of relay 9LR closed, a circuit is established including this contact, back contact $c$ of relay 10LASR, back contact $b$ of relay 10TER, front contact $a$ of relay 10LHSPR, and front contact $c$ of relay 9NWCR for energizing relay 10LAHR. With front contacts $a$ and $b$ of relays 10LAHR and 10LDR, respectively, closed, an obvious circuit is established for supplying energy to green lamp G of signal 10LA, so that this signal displays a green or clear aspect for a westbound train.

The operation of the apparatus as the train enters the single track stretch at the eastern end, and moves through the various track sections to the west end and vacates the stretch is similar to that described previously for the eastbound train movement. It is believed that a detailed description of the circuit operation under these conditions is unnecessary, since the symmetry of the circuits will readily provide an understanding of the circuit operation for the westbound train, when considered in the same sequence as the progress of the eastbound train previously described. It is to be noted that steady energy will be supplied to the rails of the track sections in the rear of the westbound train, so that when the westbound train vacates the single track stretch, each of the track circuits is energized with steady energy flowing from the east end to the west end of that section. The reception of this steady energy at the west end of the stretch will provide a suitable block clear indication in the control machine to permit subsequent reversal of traffic to the eastbound direction if so desired.

I shall now describe the operation of the system embodying my invention under various conditions involved where a train enters or leaves the single track stretch through a hand-operated switch governed by an electric switch lock. In connection with such operation, it can be pointed out that, in general, the circuits are arranged so that any initial operation by a member of the train crew prior to the unlocking of the switch will not result in putting a signal to stop for an established route for the single track stretch or place a signal at stop in the face of an approaching train. The electric switch lock is under the control of the operator for moves either to or from the main track. Moves from the main track are established by providing a suitable time interval from the time that the track section in which the switch is located is occupied by a train. Moves out of the siding onto the single track stretch are governed by transmission of coded energy from each end of the single track stretch in order to obtain approach locking for the electric switch lock. Additionally, the circuits are arranged so that, after the switch lock has been released, the unlocked condition will be retained until the handthrow switch has been placed normal and the initiating circuits restored to their normal condition. These functions are all accomplished with a minimum number of line wires extending between the switch lock location and the field control locations.

In describing the detailed operation of the switch lock control circuits, it will first be assumed that a train on the siding wishes to enter the single track stretch through the switch 6W, governed by electric switch lock 6WL, and to thereafter proceed to either the east end or west end of the single track stretch. The crew of the train in the siding will communicate with the operator, by the usual telephone system provided in such railway signaling arrangements, and inform the operator of the fact that they desire to enter the single track stretch at switch lock location 6WL, and to thereafter traverse the single track stretch to leave the stretch either at the east or west end thereof.

Assuming that there is no conflicting train movement at the time, the control operator will transfer switch lock control lever 6WLO on the control machine from its normal to its reverse position. Operation of the associated starting push button 1—2STB will cause the initiation of the transmission of a control code to field unit 1—2. When station selection relay 1—2S picks up to designate unit 1—2 as the field location to receive the control code, front contacts $e$ and $f$ of relay 1—2S establish a circuit, through terminals 31 and 29 and now including reverse contacts *c* and d of lever 6WLO, for reversing the polarity of the energy supplied to switch lock control relay 6WLSR at the west end of the single track stretch. With contacts of relay 6WLSR operated to their reverse position, energy is supplied from terminal B to line wire 63 over reverse contact *a* of relay 6WLSR. At signal location 4S—5S, where the major portion of the apparatus involved in the control of electric switch lock 6WL is located, the presence of energy on line wire 63 energizes relay 6WLSPR, over back contact *a* of relay 6WLPAR, so that relay 6WLSPR picks up. As previously pointed out, the negative terminals N of the local batteries provided at each of these locations are connected by line wire 67 to complete the circuit.

At the switch lock location, a train crewman will have operated the initiating switch 6WLSW, which, as pointed out hereinbefore, may be contacts operated by the removal of a padlock in the electric switch lock mechanism, or may be contacts actuated by the opening of a door or other cover to gain access to the switch lock operating handle. In any event, these contacts form a preliminary circuit actuator for the train crew. When contact *b* of switch 6WLSW opens, the supply of energy from terminal B to line wire 71 is interrupted. Relay 6WLPR, which is energized from line 71 over back contact *b* of relay 6WLSPR, or over front contact *b* of relay 6WLSPR and front contact *d* of relay 6WLPR, is thus deenergized and releases.

Before permitting further operation of the apparatus, it is necessary to check at this time that noncoded or steady energy is being supplied to the track circuits in the stretch, to insure that the entering signals have not been cleared for a traffic movement. This function is accomplished by relay 6SEPR, which is energized as a result of the operation of a thermal time element relay SETER, which is utilized to insure that relay 6SEPR is not energized due to any transient condition but only as a result of steady energy being applied for a predetermined period of time to the circuits involved.

Relay SETER is energized, if the eastbound traffic direction is established as shown in the drawings, by a circuit which extends from terminal B at front contact *a* of relay 6WLSPR, over back contact *a* of relay 6WLPR, back contact *c* of relay 6WLTPR, back contact *b* of relay 2LTBPR, front contact *g* of relay 6NWPSR, front contact *e* of relay 2LTFPR, back contact *b* of relay 6WLSCR, back contact *c* of relay 6SEPR, and the heater winding of relay SETER to terminal N. If westbound traffic direction is established, the circuit for relay SETER branches from that just traced after back contact *c* of relay 6WLTPR and includes front contact *f* of relay 6NWPSR, back contact *b* of relay 4RTBPR, front contact *f* of relay 4RTFPR, and thence back contact *b* of relay 6WLSCR, and back contact *c* of relay 6SEPR. With either traffic condition, after a suitable time interval, front contact *b* of relay SETER closes. Energy is then supplied, over the one of the previously traced circuits then effective for relay SETER to back contact *b* of relay 6WLSCR, and thence over front contact *b* of relay SETER to the winding of relay 6SEPR, which then picks up. When front contact *c* of relay 6SEPR closes, it establishes a stick circuit which by-passes contact *b* of relay SETER. Back contact *c* of relay 6SEPR interrupts the supply of energy to the heater winding of relay SETER, which shortly restores to normal.

With relay 6SEPR picked up and relay 6WLPR released, the stick circuit presently energizing relay 6NWPSR is now open at the multiple path through back contact *a* of relay 6SEPR and front contact *b* of relay 6WLPR, so that relay 6NWPSR releases. The opening of front contact *f* or *g* of relay 6NWSPR interrupts the existing stick circuit of relay 6SEPR which, thus deenergized, shortly releases. The closing of back contact *d* of relay 6NWPSR establishes a circuit for transmitting an indication to the control machine, which circuit may be traced from terminal B at back contact *d* of relay 6WLTPR, over back contact *d* of relay 6NWPSR, line wire 65, and the winding of relay 6WLKR to terminal N. When front contact *a* of relay 6WLKR closes, an indication code is transmitted to the control machine which results in the energization of relay 6WLRK in the control machine.

Relay 6WLSK in the control machine was previously energized as a result of the initial operation of relay 6WLSR, reverse contact *b* of relay 6WLSR governing the indication code which operates relay 6WLSK. With back contact *b* of relay 6WLSK open, indication lamp 6WLNKE is extinguished, and with front contact *b* of relay 6WLRK closed, indication lamp 6WLSKE is lighted.

At this time, relay 6WLP in the control machine is energized by a circuit which may be traced from terminal B at front contact *c* of relay 6WLRK, over back contact *b* of relay 2RGS, contact *b* of lever 2GLO closed in the normal or left position, reverse contact *a* of switch lock lever 6WLO, contact *c* of lever 10GLO closed in the normal or right position, back contact *d* of relay 10LGS, and the winding of relay 6WLP to terminal N. This circuit insures that relay 6WLP can only be picked up if no preliminary operations have taken place to clear an entering signal into the stretch, and also insures that the preliminary indication has been received from the switch lock control location that steady energy is present at that location. When relay 6WLP picks up, its front contact *a* establishes a first stick circuit, including front contact *c* of relay 6WLSK, to maintain the relay energized.

Relay 6WLST in the control machine is a slow acting repeater relay of relay 6WLP, and is energized over front contact *h* of this latter relay. The auxiliary energizing circuits for code starting relays 1—2ST and 9—10ST include so-called "out of correspondence" networks comprising contacts *a* and *i* of relays 6WLST and 6WLP, respectively, for relay 1—2ST, and contact *j* of relay 6WLP and contact *b* of relay 6WLST for relay 9—10ST. It is obvious that, when relay 6WLP picks up, momentary circuits are established, before the pick up of relay 6WLST, over the associated front contacts of relay 6WLP and back contacts of relay 6WLST, for energizing starting relays 1—2ST and 9—10ST to initiate control codes to the opposite ends of the single track stretch.

When a move is to be made out of a siding onto the single track stretch at a switch lock location, it is necessary to have coded track energy fed from each end of the stretch in order to obtain an unlock of the electric switch lock. It is also necessary to maintain the supply of coded energy fed from each end of the single track stretch until the train has completed its move throughout the stretch. Otherwise, if the coded energy supply at the exit end of the stretch toward which the train is proceeding is cut off, the train will receive stop aspects at all intervening intermediate signals. It follows therefore that it is necessary to provide means for operating the traffic relays at both ends of the single track stretch to the positions in which they will be capable of causing the transmission of coded energy to the stretch at the corresponding end thereof. This function is accomplished by means of front contacts *e* and *f* of relay 6WLP which bridge the contacts *d* and *e* of traffic relay 2—10F so that, regardless of the position of the office traffic relay, the control codes transmitted to field locations at each end of the stretch are such as to position the traffic relays at those points to the position in which they govern the supply of coded energy to the windings of their associated code transmitting relays. Thus, at the west end, relay 2RFSR is positioned normal while relay 10LFSR at the east end is positioned or held reverse.

The stick circuit network for relay 6WLP further cludes a second path, comprising back contact *d* of relay 10LBK and back contact *e* of relay 2RBK, in multiple with front contact *c* of relay 6WLSK previously described. With steady energy cut off from the single track stretch, as described in the preceding paragraph, both relay 2RBK and relay 10LBK will remain released to complete this second stick circuit. The purpose of the additional stick circuit is to insure that relay 6WLP will remain energized even after relay 6WLSK has been restored to its normally released position by the restoration of lever 6WLO to normal after the relocking of the electric lock in the field. In this manner, relay 6WLP is maintained energized until such time as steady energy is again received at one end of the single track stretch, indicating that the train which moved out of the siding and through the single track stretch has vacated the stretch.

Again considering the action of the circuits at signal location 4S—5S which are involved in the control of the switch lock, it will be noted that the release of relay 6NWPSR causes the interruption of the circuits for code transmitting relays 2LCR and 4RCR, the circuit for relay 2LCR being interrupted by front contact *a* and the circuit for relay 4RCR being interrupted at front contact *h* of relay 6NWPSR. Under the conditions shown, relay 4RCR, which was energized to transmit steady energy eastward through section 4T, is now deenergized and releases, with the result that the steady energy in section 4T is cut off. As previously explained, the cutting off of steady energy at the west end of section 4T will shortly result in the interruption of the supply of steady energy at the west end of section 6T. When the relays at the east end of the single track stretch release, and with relay 10LFSR in its reverse position, the previously traced circuit is established for energizing relay 6LCR to transmit coded energy from the east end of the stretch toward the west end of the stretch, the code rate depending upon whether or not signal 10RA has been cleared for train movement.

Reception of the coded energy at the west end of section 6T causes the signal 6S to clear, and results in the transmission of coded energy from the east end of section 4T to signal location 4S—5S, so that relays 4RTFPR, 4RTBPR, and possibly 4—5HR pick up. With the circuit for relay 2LCR interrupted, this coded energy cannot be repeated westward through section 2T. At the west end of the stretch, the positioning of traffic relay 2RFSR to its left-hand position causes the transmission of coded energy from the west end of section 2T, in the manner previously explained. The reception of this coded energy at the east end of section 2T causes the code following operation of track relay 2LTR and the consequent pick up of repeater relays 2LTFPR and 2LTBPR. At this time, it is apparent that relays 2LTFPR, 4RTFPR, 2LTBPR, and 4RTBPR will be energized as a result of the coded energy being fed from each end of the single track stretch to signal location 4S—5S. With both relay 2LTBPR and relay 4RTBR picked up, the circuit for supplying energy to the primary winding of transformer DT is interrupted at contacts *a* of these relays. Thus relay 4—5HR receives no energy from the secondary winding and this relay remains released or, if energized when relay 4RTR initially receives coded energy, releases. With relay 4—5HR released, signals 4S and 5S continue to display a red or stop aspect. Obviously, relay 4—5DR also remains released.

With relays 2LTBPR and 4RTBPR picked up and relay 6SEPR released, a circuit is established for energizing relay 6WLSCR. This circuit is traced from terminal B at front contact *a* of relay 6WLSPR, over back contact *a* of relay 6WLPR, a back contact *c* of relay 6WLTPR, front contact *b* of relay 2LTBPR, front contact *b* of relay 4RTBPR, back contact *f* of relay 6NWPSR, back contact *b* of relay 6SEPR, back contact *a* of relay SETER, and the winding of relay 6WLSCR to terminal N. When front contact *a* of relay 6WLSCR closes, it establishes a by-passing stick circuit around back contact *b* of relay 6SEPR and back contact *a* of relay SETER. If the train on the spur track is to enter the single track over switch 6W behind a westbound train moving through section 2T, coded energy from the west end of the stretch is shunted away from relay 2LTR by the train occupying section 2T. With relay 2LTR remaining released, relay 2LTBPR is also released and its front contact *b* is open in the circuit just traced for relay 6WLSCR. However, when the through train passes signal location 4S—5S, relay 2LSR remains energized through its stick circuit, completed in the manner previously described. Thus front contact *d* of relay 2LSR bypasses the open front contact *b* of relay 2LTBPR to complete the circuit for relay 6WLSCR. Under these conditions, relay 6NWPSR is deenergized, to close its back contact *f* in the circuit for relay 6WLSCR, when its stick circuit is interrupted at back contact *c* of relay 6WLTPR which is energized, in a manner hereinafter explained, when the through train occupies section 4T. Also under these conditions, the crew of the train in the spur track does not actuate switch 6WLSW until after the through train passes track switch 6W. If an eastbound train is occupying section 6T, it is obvious that coded energy will flow from east to west in section 4T, as previously explained to allow the circuit for relay 6WLSCR to be completed in the usual manner.

Relay SETER is now supplied with energy by a circuit including front contact *b* of relay 6WLSCR and back contact *c* of relay 6SEPR, so that the thermal relay is set into operation for a second cycle. After a predetermined time interval determined by the construction and setting of the time element relay, front contact *b* of relay SETER closes, thereby energizing the winding of relay 6SEPR which then picks up. Front contact *c* of relay 6SEPR establishes a stick circuit around front contact *b* of relay SETER and back contact *c* interrupts the supply of energy to the heater winding of the thermal relay, which again releases shortly. The purpose of operating timing relay SETER through a second cycle after the pick up of relay 6WLSCR is to insure that the coded energy will be received for a predetermined interval before further unlocking action can take place, in order to guarantee against false operation by transient conditions.

With relays 6WLSCR and 6SEPR picked up at this time, a circuit is established for energizing relay 6WLPAR, which is traced from terminal B through the winding of relay 6WLPAR, front contact *c* of relay 6WLSCR, front contact *d* of relay 6SEPR, back contact *d* of relay 6WLPR, front contact *b* of relay 6WLSPR, line wire 71, the winding of relay 6WLPBR, and contact *a* of switch 6WLSW to terminal N. As a result, both relay 6WLPAR at signal location 4S—5S and relay 6WLPBR at the switch lock location are energized and pick up. Front contact *b* of relay 6WLPAR establishes a by-passing or stick circuit around the front contacts of relays 6WLSCR and 6SEPR in the circuit just traced. The purpose of this stick circuit is to insure that relays 6WLPAR and 6WLPBR remain energized after the train has moved out of the spur track and onto the main line stretch, when the interruption of the coded track energy will cause the release of code detecting relay 4RTBPR with the subsequent release of relay 6WLSCR. The opening of back contacts *c* and *d* of relay 6WLPAR interrupts the connections to the winding of normally energized relay 6NWPR, which then releases. The release of relay 6NWPR serves no useful purpose at this time, although its front contacts *b* and *c* open the circuits for relays 6NWPSR and 4RCR, respectively, at another point.

At this time, a circuit is established for energizing switch lock magnet 6WLM at the switch lock location. This circuit extends from terminal B at front contact *c* of relay 6WLPAR, over line wire 73, front contact *a* of relay 6WLPBR, the magnet winding, front contact $b$ of relay 6WLPBR, line wire 75, and front contact $d$ of relay 6WLPAR to terminal N. Accordingly, the armature of the switch lock will be energized so that the locking dog is lifted from its position on the locking quadrant. The switch lock may now be operated to its unlock position to permit the hand-throw switch to be reversed and the train to move out of the spur track over switch 6W onto the main line.

At this time, the operator may return the lever 6WLO in the machine to its normal position, thus transmitting a control code to station 1—2 which returns relay 6WLSR to its normal position. Although the opening of reverse contact $a$ of this relay interrupts the initial energizing circuit for relay 6WLSPR, this latter relay is now energized over front contact $a$ of relay 6WLPAR. This direct control circuit removes the control of relay 6WLSPR from the operator and assures that, once the switch unlock control has been obtained, it cannot be removed until the track switch has been placed in its normal position and the electric switch lock restored to its normal condition.

The restoration of relay 6WLSR to its normal position assures that any other electric switch lock which may be located elsewhere in this single track stretch cannot now be released to permit a second train to enter the single track stretch after the first train has obtained permission to occupy the main track. The opening of reverse contact $b$ of relay 6WLSR causes an indication to be transmitted to the office to release relay 6WLSK. Closing of back contact $b$ of this latter relay again energizes lamp 6WLNKE so that both switch lock lamps are lighted at this time. Opening of contact $a$ of lever 6WLO interrupts the pickup circuit for relay 6WLP but this relay remains energized over its second stick circuit including back contacts $d$ and $e$ of relays 10LBK and 2RBK, respectively.

It is to be noted that contact $b$ of relay 6NWPSR is utilized in the lighting circuit for signal 4S, so that with contact $b$ of relay 6NWPSR released, signal 4S can only display a red aspect irrespective of the conditions of the other controlling relays in the lighting circuit. This affords additional protection to the train entering the single track stretch from a siding.

At the time the train moves out on the single track stretch from the siding, it shunts section 4T so that the coded energy being supplied westward over the section is cut off. As a result, relays 4RTFPR and 4RTBPR at signal location 4S—5S are deenergized. When back contact $a$ of relay 4RTBPR closes, the circuit arrangement for supplying energy to decoding transformer DT, also including front contact $a$ of relay 2LTBPR, back contact $b$ of relay 4RTR, and front and back contacts $b$ of relay 2LTR, is established so that relay 4—5HR will now pick up in response to the coded energy being supplied eastward over section 2T. Signal 5S will now display a yellow or green aspect depending on the frequency of the code being supplied from the west end of the stretch, to thereby afford a proceed signal for the train if it is to move westward through the stretch. In a similar manner, the code being supplied from the eastern end of the stretch causes signal 6S to display a yellow or green aspect, depending on the frequency of the code, to thereby provide a proceed signal for the train if it is to move eastward through the stretch.

The opening of front contact $b$ of relay 4RTBPR interrupts the stick circuit for relay 6WLSCR, which then releases. The opening of front contact $b$ of relay 6WLSCR interrupts the direct connection to terminal B for the existing stick circuit of relay 6SEPR and, since the circuit over the corresponding back contact is open at front contact $g$ of relay 6NWSPR and front contact $f$ of relay 4RTFPR, relay 6SEPR is deenergized and releases. However, as previously mentioned, even though front contacts $c$ and $d$ of relays 6WLSCR and 6SEPR, respectively, are open, the stick circuit for relay 6WLPAR over its own front contact $b$ bypasses these open front contacts and relays WLPAR and WLPBR remain energized.

The train having moved from the siding to the main track, the trainman will now restore the hand-throw switch and the electric switch lock to their normal positions, with the result that relays 6WLPBR and 6WLPAR are deenergized by the opening of contact $a$ of switch 6WLSW and these relays release. This deenergizes the switch lock magnet 6WLM which releases to close its contact $a$. With the closing of this contact, the contacts controlled by the switch movement, back contacts $a$ and $b$ of relay 6WLPBR, and back contacts $c$ and $d$ of relay 6WLPAR, the circuit over line wires 73 and 75 is complete to in turn reenergize relay 6NWPR. Relay 6WLSCR was deenergized when relay 4RTBPR released due to the shunting of relay 4RTR by the train. If relay 6WLSR is restored to normal, the opening of front contact $a$ of relay 6WLPAR deenergizes relay 6WLSPR. The release of this latter relay completes, at its back contacts $a$ and $b$, respectively, the energizing circuits for relays 6NWPSR and 6WLPR. In the circuit for relay 6NWPSR, back contact $a$ of relay 6SEPR and front contact $b$ of relay 6NWPR were previously closed. Conditions in the field are now restored to normal. The opening of back contact $d$ of relay 6NWPSR deenergizes relay 6WLKR which releases, thereby transmitting an indication to the office to release relay 6WLRK. This extinguishes lamp 6WLSKE to indicate to the operator that the switch lock has been restored to its normal condition.

It will now be assumed that the train which moved out of the spur track onto the single track stretch proceeds westward to the west end of the stretch, signals 5S and 2LA having been cleared for this train movement as previously described. As the train moves through section 4T, and then section 2T, the coded energy supplied from the east end of the stretch will follow the train, so that when the train moves out of section 2T at the west end of the stretch, code following track relay 2RTR will commence following the impulses of coded energy supplied to its winding. As a result, relays 2RTFPR, 2RTBPR, 2RHR, and 2RDR will all be energized and pick up. At this time, relay 2RFSPR functions to transmit a long impulse of energy from the west end of the stretch to the east end of the stretch. With contact $c$ of relay 2RFSR already in its left-hand position, the opening of back contact $b$ of relay 2RHR interrupts the stick circuit which energizes relay 2RFSPR over its own front contact $b$, so that relay 2RFSPR releases. A circuit is then prepared, including back contact $a$ of relay 2RFSPR and normal contact $b$ of relay 2RFSR, for supplying energy to the winding of relay 2RCR as soon as the train vacates section 1T, as determined by the closing of front contact $a$ of relay 1TR. With this portion of the circuit complete, during the next "off" period of the code being received at the west end of the stretch, back contact $a$ of relay 2RTR closes the circuit and energizes relay 2RCR, which then picks up. Front contact $a$ of relay 2RCR connects track battery 2RTB across the rails at the west end of section 2T, while back contact $a$ disconnects the winding of relay 2RTR from the section rails. Since relay 2RTR ceases its code following operation, relay 2RHR will release shortly thereafter and back contact $b$ of this relay will again be closed in the circuit network for relay 2RFSPR. However, with back contact $b$ of relay 2RFSPR closed, energy is supplied to the winding of thermal timing relay 2RFSTE, by the circuit which may be traced from terminal B at the back contact $b$ of relay 2RHR over back contact $b$ of relay 2RFSPR and the heater winding of the thermal relay to terminal N. The thermal relay is set to operate in some predetermined time interval, such as, for example, twelve seconds.

During this twelve-second interval, steady energy will be supplied at the west end of the stretch. During the next "off" interval of code transmitting relay 2LCR at the east end of section 2T, code following track relay 2LTR will pick up and maintain its contacts picked up to cause the transmission of steady energy through the next section from west to east. In a manner previously described, this steady energy is cascaded section by section from the west to the east end of the stretch. At this location, with reverse contact *a* of relay 10LFSR closed, the reception of steady track energy causes relay 10LBKR to pick up to transmit an indication code to the control machine which results in the energization of relay 10LBK in the machine.

When back contact *d* of relay 10LBK opens, the remaining stick circuit for relay 6WLP is interrupted. With its pick up circuit already open, relay 6WLP is thus deenergized and releases, followed shortly thereafter by the release of relay 6WLST. This action results in an out-of-correspondence condition of the contacts of relays 6WLP and 6WLST in the auxiliary circuits for energizing the starting relays for transmitting control codes to the two field locations. In addition, front contacts *e* and *f* of relay 6WLP which by-pass contacts *d* and *e* of traffic relay 2—10F are open, so that the control codes transmitted to both ends of the stretch will position the traffic relays in accordance with the position of traffic relay 2—10F. With the contacts of relay 2—10F assumed to be in their right-hand position as shown in the drawings, and as originally described, traffic relay 2RFSR at the west end of the stretch will have its contacts positioned to their right-hand position, while at the east end of the stretch the contacts of relay 10LFSR will remain in their right-hand position. At the west end of the stretch, with reverse contact *b* of relay 2RFSR and normal contact *a* of relay 2RHSR closed, the circuit originally traced for supplying steady energy to the winding of relay 2RCR is again complete, so that the transmission of steady energy through the stretch from west to east is maintained, establishing eastward traffic direction.

As previously pointed out, thermal relay 2RFSTE is set for a suitable time interval to permit the action described above to take place. At the expiration of this time interval, contact *a* of relay 2RFSTE will close, thereby establishing a pickup circuit for the relay 2RFSPR. When the contacts of this relay pick up, front contact *b* establishes the stick circuit originally traced and back contact *b* deenergizes relay 2RFSTE. The system is now restored to its original condition as shown in the drawings and as initially described.

If relay 2—10F at the office is positioned normal, relays 2RFSR and 10LFSR will also be positioned normal. With normal contacts *a* and *b* of relays 10LHSR and 10LFSR, respectively, closed, relay 6LCR is steadily energized. When relay 2RFSPR is energized, as described in the preceding paragraph, the long pulse of energy from this location is terminated, since relay 2RCR is no longer steadily energized. Steady energy from the east end feeds through the stretch and overrides any coded energy from the west to restore the system to its initial condition. The operation of the circuits for the condition wherein the train leaving the spur track proceeds to the east end of the stretch instead of the west end, for either condition of initial traffic direction, is essentially the same as that described above, and need not be described in further detail.

I shall now describe the operation of the apparatus under the various conditions which occur when a train moving through the single track stretch is to move through the hand-operated switch governed by the electric switch lock into the spur track. It will be assumed that, with the traffic direction established as shown, an eastbound train is to enter the stretch at the west end and proceed through the stretch to the swich lock location, at which location it is to enter the spur track. Accordingly, the control operator clears an entering signal at the west end of the stretch in the manner previously described for a train movement through the stretch in the eastbound direction. Steady energy is removed at the left-hand end of the stretch and coded energy is supplied from the east end of the stretch through the various track sections to clear the intermediate signals and the entering head block signal. Additionally, the operator may reverse switch lock lever 6WLO to transmit a control code to field location 1—2 where relay 6WLSR will be operated to its reverse position. An indication is then transmitted to the control machine to energize relay 6WLSK, back contact *b* of this relay extinguishing indication lamp 6WLNKE associated with the switch lock control lever. The operator is thus informed that a switch unlock control has been stored at the field location.

With reverse contact *a* of relay 6WLSR closed, energy is supplied to the circuit including line wire 63 and back contact *a* of relay 6WLPAR for energizing relay 6WLSPR, so that this relay picks up. No further circuit action takes place at the switch lock location, or at the intermediate signal location 4S—5S where the major portion of the circuitry for the switch lock is located, until the train moves eastward through the stretch and passes signal 4S. The operation of the apparatus associated with detector section 1T and track section 2T is similar to that previously described in connection with an eastbound train movement.

When the eastbound train passes signal location 4S—5S and shunts track section 4T, relay 4RTFPR releases as a result of the release of track relay 4RTR, as previously described. At signal location 6S—7S, relay 4LTFPR is already released, since relay 4LTR is not supplied with energy at this time. A circuit is now established for energizing relay 6WLTPR at signal location 4S—5S. This circuit is traced from terminal B at back contact *d* of relay 4LTFPR, over line wire 81, back contact *g* of relay 4RTFPR, connection 85, back contact *e* of relay 6WLTER, front contact *e* of relay 6WLPR, the winding of relay 6WLTPR, line wire 83, and back contact *e* of relay 4LTFPR to terminal N. Accordingly, relay 6WLTPR picks up and its front contact *a* establishes a stick circuit for the relay which by-passes front contact *e* of relay 6WLPR and back contact *e* of relay 6WLTER.

When relay 6WLTPR picks up, its back contact *e* interrupts the stick circuit which alone supplies energy at this time to the winding of relay 6NWPSR, and this relay releases. The closing of back contact *c* of relay 6NWPSR establishes a circuit for energizing the time element relay 6WLTER which extends from terminal B at front contact *a* of relay 6WLSPR, over front contact *b* of relay 6WLTPR, back contact *c* of relay 6NWPSR, and winding of relay 6WLTER to terminal N. Relay 6WLTER is a time element relay which is selected and arranged so that its contacts will pick up after the expiration of a predetermined time interval following the energization of the control winding of the relay. This time interval is selected so as to be at least as long as the time required for a train traveling at the lowest normal speed to progress from the farthest end of section 4T to the switch lock location. This insures that, following the entrance of the train into section 4T from either end, the time element relay will not have operated until the train has reached the vicinity of switch lock 6WL. By this means, any train which is to enter the spur track at this location will have arrived at that location before the switch lock circuits can be energized. Thus there is no possibility that a train already on the siding could accept the unlock and move out onto the main track before the train approaching on the single track stretch reaches the switch lock location.

When the train reaches the switch lock location, a crew member will operate switch 6WLSW, which results in relay 6WLPR releasing, as previously described. Assuming that time element relay 6WLTER has completed its timing cycle and has picked up, its front contact *a* establishes a stick circuit over back contact *c* of relay 6NWPSR to retain the time element relay energized. Additionally, a circuit for energizing relay 6WLSCR is completed at this time, extending from terminal B at front contact *a* of relay 6WLSPR, over back contact *a* of relay 6WLPR, front contact *c* of relay 6WLTPR, front contact *b* of relay 6WLTER, and the winding of relay 6WLSCR to terminal N. It is to be noted that front contact *a* of relay 6WLTER and front contact *b* of relay 6WLTPR complete a second circuit from terminal B in multiple with front contact *a* of relay 6WLSPR. The stick circuit for relay 6WLSCR over its own front contact *a* is not now effective, being open at front contacts *b* and *f* of relays 4RTBPR and 4RTFPR, respectively. Front contact *b* of relay 6WLSCR now establishes the circuit including back contact *c* of relay 6SEPR for energizing the heater winding of thermal time element relay SETER. Relay SETER closes its front contact *b* after a short time interval to thereby energize relay 6SEPR. This latter relay then picks up, opening its back contact *c* to disconnect the winding of the thermal relay and establishing its own stick circuit over the corresponding front contact.

With front contacts *c* and *d* of relays 6WLSCR and 6SEPR, respectively, now closed, a circuit is established for energizing relays 6WLPAR and 6WLPBR which also includes back contact *d* of relay 6WLPR, front contact *b* of relay 6WLSPR, line wire 71, and contact *a* of switch 6WLSW, which is now closed. When relay 6WLPAR picks up, its front contact *b* establishes a stick circuit for itself and relay 6WLPBR. With these two relays picked up, the previously traced circuit for energizing switch lock magnet 6WLM is completed so that the locking dog is removed from the quadrant of the switch lock, allowing the switch lock to be operated to release the operating mechanism of the hand-throw switch. The train crew can now reverse switch 6W and the train can proceed into the spur track.

When relays 6WLPAR and 6WLPBR pick up, the circuit for relay 6NWPR is interrupted, as previously explained, and this latter relay releases. The closing of back contact *a* of relay 6NWPR establishes a circuit for energizing relay 6WLKR, this circuit also including front contact *d* of relay 6WLTPR, back contact *d* of relay 6NWPSR, and line wire 65. The pickup of relay 6WLKR causes an indication code to be transmitted to the control machine where relay 6WLRK picks up. Front contact *b* of relay 6WLRK completes the circuit for energizing indication lamp 6WLSKE. If signal lever 2GLO has been restored to normal, front contact *c* of relay 6WLRK establishes the previously traced circuit for energizing relay 6WLP, which picks up and establishes its stick circuit which includes back contacts *d* and *e* of relays 10LBK and 2RBK, respectively. Relays 6WLP and 6WLST pick up in cascade, and as previously explained, cause the transmission of control codes to the opposite ends of the stretch to position the traffic relays to their code-transmitting positions. Relay 10LFSR is already in this position, so that nothing occurs at the east end of the stretch to interfere with the code being transmitted westward through the stretch to the switch lock location.

At the west end of the stretch, relay 2RFSR operates to place its contacts in their left-hand position, so that normal contact *b* of relay 2RFSR establishes the circuit for supplying coded energy to the winding of relay 2RCR. This results in coded energy being fed eastward over section 2T, so that track relay 2TR recurrently operates its contacts to thereby cause relays 2LTBPR, 4—5HR, and 2LSR to pick up, and relay 2LTFPR to remain picked up. Coded energy is not supplied to the west end of section 4T at this time, since the circuit for relay 4RCR is interrupted by front contact *c* of relay 6NWPR.

When the train moves into the spur track and clears the insulated joints at the fouling point, its wheels and axles no longer shunt track section 4T. The train crew then restores switch 6W to its normal position, operates the switch lock to its normal position, and restores switch 6WLSW to its normal position. When switch 6WLSW is restored to its normal position, relays 6WLPAR and 6WLPBR are deenergized and release. Relay 6NWPR now picks up, being supplied with energy over line wires 75 and 73 since the contacts of the switch lock magnet and the switch circuit controller are in their normal position.

The control operator, notified by the train crew or by the lighting of lamp 6WLSKE that the train is entering the spur track, restores switch lock lever 6WLO to its normal position and transmits a control code which results in relay 6WLSR at the west end of the stretch being operated to its normal position. With relay 6WLPAR released and relay 6WLSR normal, relay 6WLSPR is deenergized and releases. This completes a circuit for energizing relay 6WLPR which includes back contact *b* of relay 6WLSPR, wire 71, and contact *b* of switch 6WLSW. When relay 6WLPR picks up, a circuit is established for energizing relay 6NWPSR, extending from terminal B at back contact *a* of relay 6WLSPR, over front contact *b* of relay 6NWPR, front contact *b* of relay 6WLPR, and the winding of relay 6NWPSR to terminal N. Accordingly, back contact *c* of relay 6NWPSR opens to interrupt the supply of energy to the winding of relay 6WLTER which thereafter releases its contacts. Also, when back contact *a* of relay 6WLPR and front contact *a* of relay 6WLSPR open, the supply of energy to the winding of relay 6WLSCR is cut off and this relay releases, thereby causing the release of relay 6SEPR. Back contact *a* of relay 6SEPR is now closed in the control circuit for relay 6NWPSR, so that this circuit is restored to its normal condition as originally described.

The coded energy which is supplied to the rails of section 2T at the west end of the stretch, as described above, is now retransmitted into section 4T, the circuit for relay 4RCR being initially closed over front contact *c* of relay 6NWPR and front contact *d* of relay 6WLTER. This latter contact is then bypassed, prior to opening, by front contact *h* of relay 6NWPSR, as originally described. Since coded energy is thus supplied to both ends of section 4T, a "code fight" ensues, until one or the other of the two track relays becomes picked up during an "off" interval of the coded energy being supplied from the associated track battery, whereupon the code transmission from that end will be discontinued, since the energized TFPR relay interrupts the circuit for the associated CR relay. Coded energy will then be supplied to the next section, where a similar "code fight" will occur, and so on, until coded energy is finally received at one end of the stretch. Depending upon which end receives the coded track energy, either relay 2RFSPR or 10LFSPR will operate to cause transmission of steady energy from that end of the stretch. This steady energy will be cascaded through the track sections to the opposite end of the stretch, to cause the corresponding block indication relay to be energized in the control machine, which is here assumed to be relay 10LBK.

When back contact *d* of relay 10LBK in the control machine opens, with back contact *c* of relay 6WLSK already open, it interrupts the stick circuit energizing relay 6WLP, which therefore releases, followed shortly by the release of the relay 6WLST. As previously pointed out, the code starting circuits for the control machine include an out-of-correspondence circuit utilizing contacts of relays 6WLP and 6WLST, so that the sequential release of these relays at this time causes control codes to be transmitted to the field locations at each end of the single track stretch. With front contacts *e* and *f* of relay 6WLP released, the traffic relays at the field locations are positioned in accordance with the position of traffic relay 2—10F in the control machine. Thus the direction of traffic will be set up in the single track stretch in accordance with the traffic direction as established by the position of the contacts of relay 2—10F. The system is thus restored to its initial condition, as shown in the drawings, with no train occupying the stretch and the direction of traffic movement set up for eastward movements.

The switch lock control circuits which form a portion of my invention are also arranged to take care of the condition in which the single track stretch is to be traversed by two trains traveling in the same direction, the first of which is to proceed directly through the stretch, and the second train is to move into the siding at the hand-throw switch location. The operation of the apparatus under such conditions will now be described.

Assuming that two eastbound trains are to proceed through the stretch, the control operator will proceed to operate signal lever 2GLO to its right-hand position and transmit a control code to the west or left-hand end of the stretch, which, in the manner previously described, causes the steady energy to be removed from that end of the stretch. This removal of steady energy results in the transmission of coded energy from the east end of the stretch to clear the intermediate signals and to clear the entering head block signal at the west end of the stretch. It will also be assumed that the control operator positions the switch lock lever 6WLO to its reverse position so that the control code causes relay 6WLSR at the west end of the stretch to be reversed, thereby resulting in the picking up of relay 6WLSPR at signal location 4S—5S.

The movement of the train past the entering signal and through sections 1T and 2T causes the apparatus to operate in the manner previously described, and a detailed description of the operation of the equipment for this portion of the train movement is deemed unnecessary. When the first eastbound train enters section 4T, relay 6WLTPR will pick up as a result of the closing of back contact *g* of relay 4RTFPR, indicating that section 4T has been occupied by a train. When relay 6WLTPR picks up, its back contact *e* interrupts the stick circuit for relay 6NWPSR, deenergizing this latter relay since back contact *a* of relay 6WLSPR is also open at this time. Accordingly, relay 6NWPSR releases and the circuit previously traced for energizing relay 6WLTER, including back contact *c* of relay 6NWPSR, front contact *b* of relay 6WLTPR, and front contact *a* of relay 6WLSPR, is completed with the result that relay 6WLTER begins its cycle of operation. Since the first train is not destined for movement into the spur track at the switch lock location, it proceeds past this location without further operation of the apparatus located at the switch lock location. Relay 6WLPR is maintained energized over the circuit including its front contact *d* and front contact *b* of relay 6WLSPR. As a result, even if relay 6WLTER completes its cycle of operation during this time and picks up, the circuit previously traced for energizing relay 6WLSCR is not closed, since this circuit is interrupted at back contact *a* of relay 6WLPR.

When the first eastbound train vacates section 4T, relay 4LCR begins to operate at the 75 code rate, the previously traced control circuit including, in part, back contact *b* of relay 6—7HR and front contact *b* of relay 6RSR, which is held up by its stick circuit. The resulting code following operation of relay 4RTR at signal location 4—5S causes relays 4RTFPR and 4RTBPR to pick up. The opening of back contact *g* of relay 4RTFPR interrupts the stick circuit of relay 6WLTPR, which then releases. When relay 6WLTER completes its operating cycle which commenced when this train entered section 4T, the closing of its front contact *c* together with the closing of back contact *e* of relay 6WLTPR completes a circuit, also including front contact *c* of relay 6WLPR which has remained energized, for energizing relay 6NWPSR. When relay 6NWPSR picks up, its front contact *e* establishes a stick circuit for the relay which bypasses the contacts of relays 6WLPR and 6WLTER. Relay 6NWPSR thus remains picked up after relay 6WLTER releases, which occurs shortly after the interruption of its stick circuit by the opening of back contact *c* of relay 6NWPSR. Front contact *a* of relay 6NWPSR closes the circuit for relay 2LCR which immediately begins to transmit coded energy through section 2T to clear signal 2RA for the following train. Additionally, front contact *b* of relay 6NWPSR is now closed so that wayside signal 4S can display a yellow or green aspect to permit the second eastbound train to move into section 4T and enter the spur track at switch lock location 6WL in the manner previously described. In order to avoid this apparent delay to the second train, the operator preferably refrains from operating switch lock lever 6WLO until after the second train has entered the stretch in the usual manner for following moves.

When the two trains are moving in the westward direction, different conditions exist. After the first westbound train vacates section 4T, it is necessary to provide some means for supplying coded energy to the rails of section 4T in order to cause relay 6WLTPR to release, to restore the circuits to their normal condition, and to permit the clearing of signal 7S to allow the second train to enter the section. With back contact *e* of relay 6WLTPR and back contact *a* of relay 6WLSPR both open at this time, the circuits for relay 6NWPSR are interrupted and front contact *h* of relay 6NWPSR is open in the circuit for controlling code transmitting relay 4RCR at signal location 4S—5S. However, this contact is bridged by front contact *d* of time element relay 6WLTER. As previously pointed out, this relay commenced its operating cycle when the first train entered section 4T, but it will be assumed that the speed at which this train is moving is such that it has vacated the section before sufficient time has elapsed for this relay to pick up. When the operating time for relay 6WLTER is completed, the relay picks up and front contact *d* establishes the circuit for supplying coded energy to the winding of relay 4RCR, so that coded energy is transmitted eastward over the rails of section 4T. This results in the code following operation of relay 4LTR at signal location 6S—7S, and the consequent energization of relay 4LTFPR. Back contacts *d* and *e* of this latter relay interrupt the circuit supplying energy to the winding of relay 6WLTPR, which then releases. As previously explained, when back contact *e* of relay 6WLTPR closes with front contact *c* of relay 6WLTER closed, a circuit is established for energizing relay 6NWPSR, which picks up and completes its stick circuit. Front contact *h* of relay 6NWPSR is now closed in the circuit for controlling relay 4RCR, so that the subsequent opening of front contact *d* of relay 6WLTER will not interrupt the supply of coded energy to the rails of section 4T. Obviously, with relay 4LTR continuing to follow code, signal 7S will display at least a yellow aspect to authorize the second westbound train to move into section 4T to arrive at the spur track location.

From the foregoing, it will be seen that my invention provides a novel and improved railway signaling system of the type employing reversible track circuits, arranged to be supplied with steady or coded energy in accordance with the direction of traffic movement through the stretch and the conditions of occupancy of the stretch, which signaling system is governed from a central control point by means of a suitable communication system. In this system, novel features are incorporated in the arrangement for controlling hand-operated electrically locked switches in the single track stretch. These circuits provide for checking the presence of steady energy in the single track stretch before permitting any action to take place which would interfere with the operation of trains through the stretch. The arrangement further provides for making moves from the single track stretch into a siding through the hand-operated electrically locked switch by means of timing the occupancy of the track section in which the hand-throw switch is located. In providing these features, the circuits utilize a minimum number of line wires extending between the switch lock location and the location of the control apparatus.

Although I have herein shown and described only one form of railway signaling system embodying my invention, it is understood that various changes and modifications may be made therein within the scope of the appended claims without departing from the spirit and scope of my invention.

Having thus described my invention what I claim is:

1. In a centralized traffic control system for a stretch of single track railroad including a communication system for transmitting control codes from a control office to field stations at each end of said stretch and for transmitting indication codes from the field stations to the office, said stretch being equipped with a reversible track circuit system which is normally energized with steady energy fed from the established entrance end of said stretch to the established exit end of said stretch, the steady energy being replaced by coded energy supplied from the established exit end of said stretch to the established entrance end of said stretch when the stretch is conditioned for a traffic movement therethrough, a track switch located within said stretch, an electric switch lock for governing the operation of said switch, manually actuated means associated with said switch lock for requesting a switch unlock, means associated with said switch lock for detecting the presence of steady energy in said track circuit system, means governed by said steady energy detection means and by said manually actuated means for transmitting a specific indication code to said control office only when the steady track energy persists for a preselected time interval and a switch unlock has been requested, means at said control office responsive to said specific indication code for transmitting control codes to said field stations effective to cause coded energy to be supplied from both ends of said stretch toward said switch lock location, and means responsive to coded track energy for unlocking said switch lock only when coded energy is received from both ends of said stretch for another preselected time interval.

2. In combination with a stretch of railway track including a first and a second track section, each section provided with a reversible track circuit normally energived with steady energy, said first section including a track switch; an electric switch lock normally deenergized for locking said track switch in its normal position, a manually operable device associated with said switch lock, control means for initiating an unlock operation of said switch lock; a steady energy detection means actuated by said track circuits, said device, and said control means for detecting the presence of continuous steady track energy over a preselected period of time at the junction of said track sections when an unlock operation is initiated and said device is in its operated condition; means responsive only to the detection of continuous steady energy when an unlock operation has been initiated for initiating the transmission of coded track energy from the remote end of each track section, code detection means responsive to the reception of coded energy through both sections and controlled by said control means and said manually operable device for indicating the reception of coded track energy from both ends of said stretch, another control circuit controlled by said code detection means for again actuating said steady energy detection means when coded track energy is continuously received over another preselected period of time, and a circuit means controlled by said code detection means when code reception is indicated, by said steady energy detection means in its actuated condition, by said control means when an unlock operation has been initiated, and by said manually operable device in its operated condition for energizing said switch lock to unlock said switch for movement from its normal position.

3. In combination with a stretch of railway track including a first and a second track section, each section provided with a reversible track circuit normally energized with steady energy, said first section including a track switch; an electric switch lock normally deenergized for locking said track switch in its normal position, a manually operable device associated with said switch lock for requesting a switch unlock action when in its operated position, control means for initiating an unlock operation of said switch lock, a timing relay means having a preselected period of operation when energized; an energizing circuit for said timing means controlled by said track circuits, said device, and said control means for operating said timing means to detect the continued presence of steady energy in said track circuits at the junction of said sections when an unlock operation is initiated and said device is in its operated position; means responsive only to the completed operation of said timing relay means for initiating the transmission of coded track energy from the remote end of each track section, code detection means responsive to the reception of coded energy through both sections and controlled by said control means and said manually operable device for indicating the reception of coded track energy from both ends of said stretch when an unlock action has been requested and initiated, another energizing circuit for said timing relay means completed by said code detection means when coded track energy is detected, and a circuit means controlled by said code detection means when code reception is indicated, by said timing relay means in its completely operated position, by said control means when an unlock operation has been initiated, and by said manually operable device in its operated position for energizing said switch lock to unlock said switch for movement from its normal position.

4. In a centralized traffic control system for a stretch of single track railroad including a communication system for transmitting control codes from a control office to field stations at each end of said stretch and for transmitting indication codes from the field stations to the office, said stretch being equipped with a reversible track circuit system which is normally energized with steady energy fed from the established entrance end of said stretch to the established exit end of said stretch, the steady energy being replaced by coded energy supplied from the established exit end of said stretch to the established entrance end of said stretch when the stretch is conditioned for a traffic movement therethrough, the combination comprising, a track switch located within said stretch, an electric switch lock for governing the operation of said switch, manually operable means associated with said switch lock for requesting a switch unlock when operated to an actuated position, a timing relay having a preselected period of operation when energized, a first means at the switch location controlled by the track circuit system for detecting steady energy in said stretch, a first energizing circuit for said timing relay controlled by said first means and said manual means and completed for said preselected period only if steady track circuit energy is continuously detected after said manual means is operated to its actuated position, control means governed by said timing relay in its operated position and said manual means in its actuated position for actuating said communication system to transmit a particular indication code to said office, means at said office responsive to said particular indication code for actuating said communication system to transmit control codes to said field stations effective to cause coded track circuit energy to be supplied to said stretch from both ends thereof toward the switch location, a second means at said switch location controlled by said track circuit system for detecting the reception of coded energy from both ends of said stretch, a second energizing circuit for said timing relay controlled by said second means and by said manual means and completed for said preselected period when said manual means is in its actuated position only if continuous coded track circuit energy from both ends is detected, and circuit means for energizing said switch lock to unlock said switch controlled by said timing relay in its operated position, by said second means in its code detecting position, and by said manual means in its actuated position.

References Cited in the file of this patent

UNITED STATES PATENTS

| | | |
|---|---|---|
| 2,344,333 | Van Horn | Mar. 14, 1944 |
| 2,367,723 | Haines | Jan. 23, 1945 |
| 2,510,324 | Talbert | June 6, 1950 |
| 2,647,987 | Failor et al. | Aug. 4, 1953 |
| 2,662,972 | Trout | Dec. 15, 1953 |
| 2,664,500 | Baker et al. | Dec. 29, 1953 |